US012761702B2

(12) United States Patent
Kim et al.

(10) Patent No.: US 12,761,702 B2
(45) Date of Patent: Oct. 13, 2026

(54) ELECTRONIC DEVICE INCLUDING FOLDABLE DISPLAY

(71) Applicant: SAMSUNG ELECTRONICS CO., LTD., Suwon-si (KR)

(72) Inventors: Dooryong Kim, Suwon-si (KR); Jaewon Yu, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 118 days.

(21) Appl. No.: 18/752,804

(22) Filed: Jun. 25, 2024

(65) Prior Publication Data

US 2024/0345632 A1 Oct. 17, 2024

Related U.S. Application Data

(63) Continuation of application No. PCT/KR2022/021195, filed on Dec. 23, 2022.

(30) Foreign Application Priority Data

Feb. 22, 2022 (KR) ........................ 10-2022-0023067
Mar. 14, 2022 (KR) ........................ 10-2022-0031424

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC combination set(s) only.
See application file for complete search history.

(56) References Cited

U.S. PATENT DOCUMENTS 11,392,179 B2 * 7/2022 Park .......................... G06F 1/16
11,416,039 B2 * 8/2022 Hsu ........................ G06F 1/1681

(Continued)

FOREIGN PATENT DOCUMENTS

EP 3734947 A1 11/2020
KR 19990030305 U 7/1999

(Continued)

OTHER PUBLICATIONS

The extended European search report for EP Application No. 22929099.4 mailed on Feb. 5, 2025.

(Continued)

*Primary Examiner* — Lisa Lea-Edmonds
(74) *Attorney, Agent, or Firm* — CANTOR COLBURN LLP

(57) ABSTRACT

An electronic device includes a display including a folding area between first and second areas; first and second housings respectively supporting the first and second areas; a hinge unit connected to the first and second housings, and operating between a folded state in which the first and second areas face each other and an unfolded state in which the first and second areas are open; a hinge housing including the hinge unit; a cap connected to the hinge housing and covering a side of the folding area; and a fixing member fixing the cap to the hinge housing. A fixing groove into which the fixing member is fixed is defined in the hinge housing. The fixing member includes a fixing part to which the cap is fixed, and a wing part protruding from the fixing part, including an end contacting the fixing groove, and limiting movement of the fixing member.

20 Claims, 16 Drawing Sheets

(56) References Cited

U.S. PATENT DOCUMENTS

| | | | | |
|---|---|---|---|---|
| 11,877,406 | B2 * | 1/2024 | Kim | H04M 1/0216 |
| 11,920,395 | B2 * | 3/2024 | Quynh | E05D 3/122 |
| 2015/0308507 | A1 * | 10/2015 | Kanamoto | F16C 33/783<br>384/484 |
| 2018/0292860 | A1 | 10/2018 | Siddiqui | |
| 2020/0293094 | A1 | 9/2020 | Liu | |
| 2021/0211530 | A1 * | 7/2021 | Jung | G06F 1/1681 |
| 2021/0294383 | A1 * | 9/2021 | Kim | G06F 1/1652 |
| 2023/0217616 | A1 * | 7/2023 | Park | G06F 1/1641<br>361/807 |
| 2023/0371191 | A1 * | 11/2023 | Kim | H04M 1/185 |
| 2024/0121904 | A1 * | 4/2024 | Kim | H04M 1/0216 |
| 2024/0345632 | A1 * | 10/2024 | Kim | G06F 1/1616 |

FOREIGN PATENT DOCUMENTS

| | | | |
|---|---|---|---|
| KR | 200266281 | Y1 | 2/2002 |
| KR | 20130104503 | A | 9/2013 |
| KR | 20200082396 | A | 7/2020 |
| KR | 20200135636 | A | 12/2020 |
| KR | 20200137902 | A | 12/2020 |
| KR | 20210012090 | A | 2/2021 |
| KR | 20210087316 | A | 7/2021 |
| WO | 2021129882 | A1 | 7/2021 |

OTHER PUBLICATIONS

International Search Report mailed Mar. 27, 2023 for PCT/KR2022/021195.

Korean Office Action for KR Application No. 10-2022-0031424 mailed on Jul. 15, 2026, citing the above reference(s).

* cited by examiner

ELECTRONIC DEVICE INCLUDING FOLDABLE DISPLAY

CROSS-REFERENCE TO RELATED APPLICATIONS

This application is a continuation application, under 35 U.S.C. § 111(a), of International Patent Application No. PCT/KR2022/021195, filed on Dec. 23, 2022, which claims priority to Korean Patent Application No. 10-2022-0023067, filed on Feb. 22, 2022 and Korean Patent Application No. 10-2022-0031424, filed on Mar. 14, 2022, the content of which in their entirety is herein incorporated by reference.

FIELD

Various embodiments described herein relate to an electronic device including a foldable display.

BACKGROUND ART

As electronic devices are gradually slimmer, efforts are being made to strengthen design features and differentiate functional elements. Electronic devices are gradually being transformed into various shapes from their typical uniform rectangular shape. There has been research to find a way to implement a deformable structure that is conveniently portable and at the same time uses a large screen display, and there is thus a growing interest in a foldable or rollable device that operates by being folded or unfolded.

An electronic device may have a flexible display, which is at least partially foldable, to provide a user with a wide display and ensure portability. The electronic device may include a hinge unit, a housing rotatably connected to the hinge unit, and a flexible display connected to the housing, and the housing may be folded with respect to the hinge unit in a range between 0 degrees indicating an unfolded state and 360 degrees in an in-folding and/or out-folding manner.

SUMMARY

An electronic device including a flexible display may include a cap, which is a structure adapted to protect an outer end of an area where the display is folded. In an embodiment, a plurality of operations, e.g., applying an adhesive such as a bond, mounting and fixing a clamp, and hardening the adhesive, to fix the cap to a housing may not be desired in the electronic device.

Using the adhesive to fix the cap, however, may complicate the process operations, cause defects such as adhesive overflow, and make disassembling and assembling difficult. To solve these problems, a fixing member including an elastic body may be used, and using it may fix the cap in a retractable or insertable manner, thereby reducing the number of process operations and improving manufacturing efficiency.

The technical goals and objectives that may be achieved by various embodiments described herein are not limited to those described above, but other technical goals and objectives not described above may also be clearly understood by those having ordinary skill in the art to which the disclosure pertains from the following description.

In an embodiment of the disclosure, there is provided an electronic device including: a display including a first area, a second area, and a folding area between the first area and the second area; a first housing supporting the first area; a second housing supporting the second area; a hinge unit connected to the first housing and the second housing, and adapted to operate between a folded state in which the first area and the second area face each other and an unfolded state in which the first area and the second area are open; a hinge housing in which the hinge unit is disposed; a cap connected to the hinge housing to cover a side of the folding area; and a fixing member adapted to fix the cap to the hinge housing, where a fixing groove into which the fixing member is inserted and fixed may be defined in the hinge housing, and the fixing member may include: a fixing part to which the cap is connected and fixed; and a wing part protruding from the fixing part such that an end contacts the fixing groove to limit a movement of the fixing member.

In an embodiment of the disclosure, there is provided an electronic device including: a display including a first area, a second area, and a folding area between the first area and the second area; a first housing supporting the first area; a second housing supporting the second area; a hinge unit connected to the first housing and the second housing, and adapted to operate between a folded state in which the first area and the second area face each other and an unfolded state in which the first area and the second area are open; a hinge housing in which the hinge unit is disposed; a cap connected to the hinge housing to cover a side of the folding area; and a fixing member adapted to fix the cap to the hinge housing, where a fixing groove into which the fixing member is inserted and fixed may be defined in the hinge housing, and the fixing member may include: a fixing part to which the cap is connected and fixed; a wing part including a plurality of sub-wings spaced apart at predetermined intervals in an insertion direction in which the fixing member is inserted into the fixing groove, where an end of the plurality of sub-wings protrudes from the fixing part to contact the fixing groove, to limit a movement of the fixing member; and an elastic member disposed between the plurality of sub-wings.

In an embodiment, after being inserted into a fixing groove, a fixing member may be restricted in movement to reduce the shakes or escapes of a cap. In addition, when assembling the cap and the fixing member of an electronic device in an embodiment, an assembling process may be streamlined and simplified to improve manufacturing efficiency, reduce the sources of defects, improve the manufacturing yield, and facilitate disassembling and reassembling the cap.

The effects of an electronic device including an edge portion in various the disclosure is not limited to those described above, and other effects not described above may also be clearly understood by those having ordinary skill in the art from the following description.

BRIEF DESCRIPTION OF DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
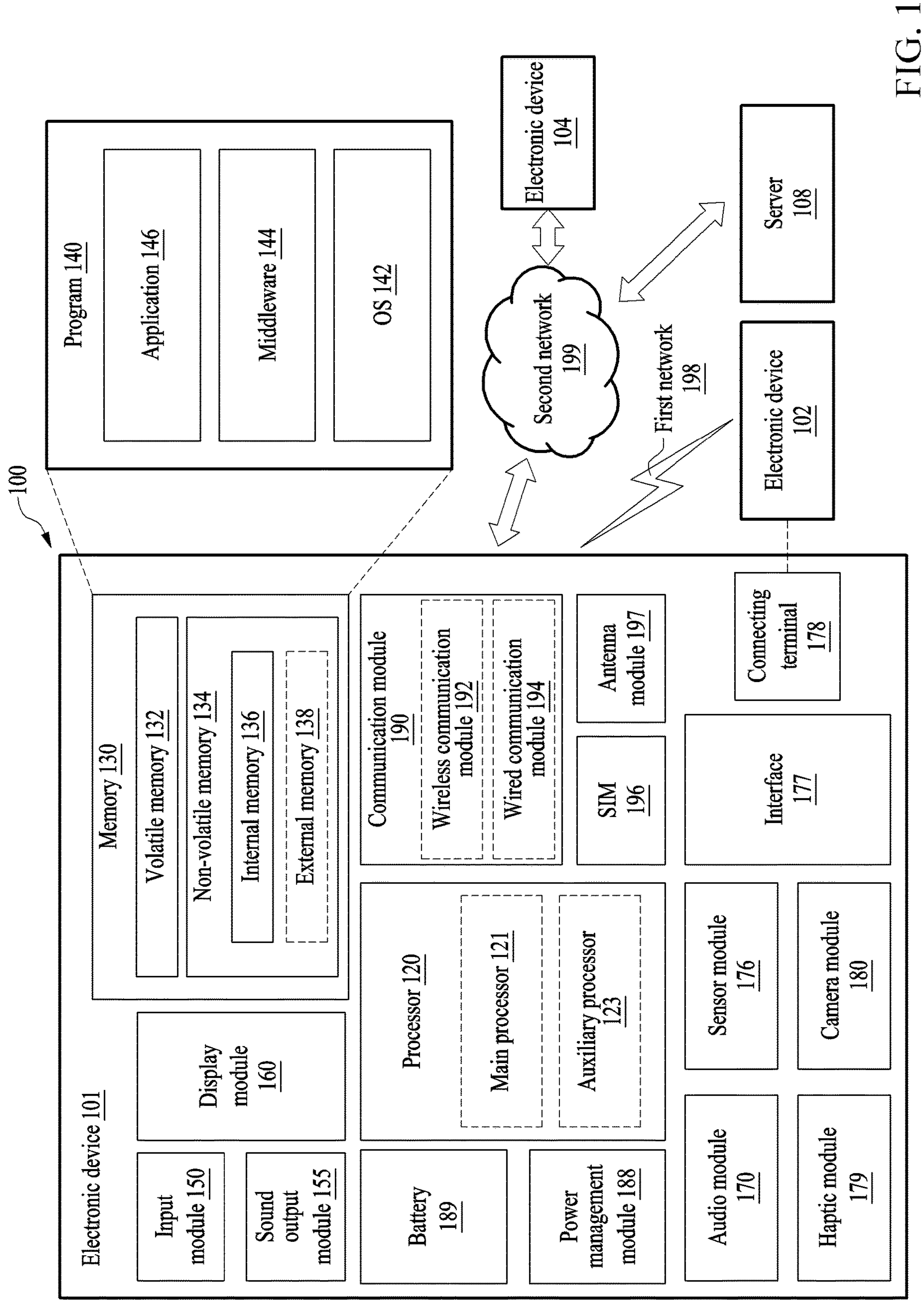
FIG. 1 is a block diagram illustrating an embodiment of an electronic device in a network environment.

Hereinafter, various embodiments will be described in greater detail with reference to the accompanying drawings. When describing the embodiments with reference to the accompanying drawings, like reference numerals refer to like elements and a repeated description related thereto will be omitted.

It is to be understood that various embodiments of the disclosure and the terms used therein are not intended to limit the technological features set forth herein to some particular embodiments but include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. Terms such as "1st" and "2nd" or "first" and "second" may simply be used to distinguish the component from other components in question, and do not limit the components in other features (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, e.g., "logic," "logic block," "part," or "circuitry." A module may be a single integral component, or a minimum unit or part thereof, adapted to perform one or more functions. For example, in an embodiment, the module may be implemented in the form of an application-specific integrated circuit (ASIC).

Various embodiments as set forth herein may be implemented as software (e.g., a program 140) including one or more instructions that are stored in a storage medium (e.g., an internal memory 136 or an external memory 138) that is readable by a machine (e.g., an electronic device). In an embodiment, a processor of the machine may invoke at least one of the one or more instructions stored in the storage medium and execute it, for example. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method described herein may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. When distributed online, at least part of the computer program product may be temporarily generated or at least temporarily stored in the machine-readable storage medium, such as a memory of the manufacturer's server, a server of the application store, or a relay server.

In various embodiments, each component (e.g., a module or a program) of the above-described components may include a single entity or multiple entities, and some of the multiple entities may be separately disposed in different components. In various embodiments, one or more of the above-described components may be omitted, or one or more other components may be added. In an alternative embodiment or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration in various embodiments. In various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100. Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute software (e.g., a program 140) to control at least one other component (e.g., a hardware or software component) of the electronic device 101 connected to the processor 120, and may perform various data processing or computation, for example. In an embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from or in conjunction with, the main processor 121. In an embodiment, when the electronic device 101 includes the main processor 121 and the auxiliary processor 123, the auxiliary processor 123 may be adapted to consume less power than the main processor 121 or to be specific to a specified function, for example. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specifically for artificial intelligence (AI) model processing. An AI model may be generated by machine learning. The learning may be performed by the electronic device 101, for example, in which the AI model is performed, or performed via a separate server (e.g., the server 108). Learning algorithms may include, but are not limited to supervised learning, unsupervised learning, semi-supervised learning, or reinforcement learning, for example. The AI model may include a plurality of artificial neural network layers. An artificial neural network may include a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, for example, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include software (e.g., the program 140) and input data or output data for a command related thereto, for example. The memory 130 may include the volatile memory 132 or the non-volatile memory 134. The non-volatile memory 134 may include internal memory 136 and/or external memory 138.

The program 140 may be stored as software in the memory 130 and may include an operating system (OS) 142, middleware 144, or an application 146, for example.

The input module 150 may receive, from outside (e.g., a user) the electronic device 101, a command or data to be used by another component (e.g., the processor 120) of the electronic device 101. The input module 150 may include a microphone, a mouse, a keyboard, a key (e.g., a button), or a digital pen (e.g., a stylus pen), for example.

The sound output module 155 may output a sound signal to the outside of the electronic device 101. The sound output module 155 may include a speaker or a receiver, for example. The speaker may be used for general purposes, such as playing multimedia or playing a recording. The receiver may be used to receive an incoming call. The receiver may be implemented separately from the speaker or as a part of the speaker. The display module 160 may visually provide information to the outside (e.g., a user) of the electronic device 101. The display module 160 may include a display, a hologram device, or a projector, and a control circuitry to control its corresponding one of the displays, the hologram device, and the projector, for example. The display module 160 may include a touch sensor adapted to sense a touch, or a pressure sensor adapted to measure an intensity of a force of the touch.

The audio module 170 may convert sound into an electric signal or vice versa. The audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor, for example.

The interface 177 may support one or more specified protocols to be used by the electronic device 101 to couple with an external electronic device (e.g., the electronic device 102) directly (e.g., by wire) or wirelessly. The interface 177 may include a high-definition multimedia interface (HDMI), a universal serial bus (USB) interface, a secure digital (SD) card interface, or an audio interface, for example.

The connecting terminal 178 may include a connector via which the electronic device 101 may physically connect to an external electronic device (e.g., the electronic device 102). The connecting terminal 178 may include an HDMI connector, a USB connector, an SD card connector, or an audio connector (e.g., a headphones connector), for example.

The haptic module 179 may convert an electric signal into a mechanical stimulus (e.g., a vibration or a movement) or an electrical stimulus, which may be recognized by a user via their tactile sensation or kinesthetic sensation. The haptic module 179 may include a motor, a piezoelectric element, or an electric stimulator, for example.

The camera module 180 may capture a still image and moving images. The camera module 180 may include one or more lenses, image sensors, ISPs, and flashes.

The power management module 188 may manage power supplied to the electronic device 101. The power management module 188 may be implemented as at least a part of a power management integrated circuit (PMIC), for example.

The battery 189 may supply power to at least one component of the electronic device 101. The battery 189 may include a primary cell, which is not rechargeable, a secondary cell, which is rechargeable, or a fuel cell, for example.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, e.g., the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., an LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4th generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve a relatively high data transmission rate, for example. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 millisecond (ms) or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in a communication network, such as the first network 198 or the second network 199, may be selected by the communication module 190 from the plurality of antennas, for example. The signal or power may be transmitted or received between the communication module 190 and the external electronic device via the at least one selected antenna. In an embodiment, another component (e.g., a radio frequency integrated circuit (RFIC)) other than the radiating element may be additionally formed as a part of the antenna module 197.

In an embodiment, the antenna module 197 may form an mmWave antenna module. The mmWave antenna module may include a PCB, an RFIC on a first surface (e.g., a bottom surface) of the PCB or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

In an embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. All or some of operations to be executed by the electronic device 101 may be executed by one or more of the external electronic devices (e.g., the electronic devices 102 and 104 and the server 108). In an embodiment, when the electronic device 101 needs to perform a function or a service automatically, or in response to a request from a user or another device, the electronic device 101, instead of, or in addition to, executing the function or service, may request one or more external electronic devices to perform at least a part of the function or service, for example. The one or more external electronic devices receiving the request may perform the at least part of the function or the service requested, or an additional function or an additional service related to the request and may transfer a result of the performance to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra-low latency services using, e.g., distributed computing or MEC. In another embodiment, the external electronic device (e.g., the electronic device 104) may include an Internet-of-things (IoT) device. The server 108 may be an intelligent server using machine learning and/or a neural network. The external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2A:
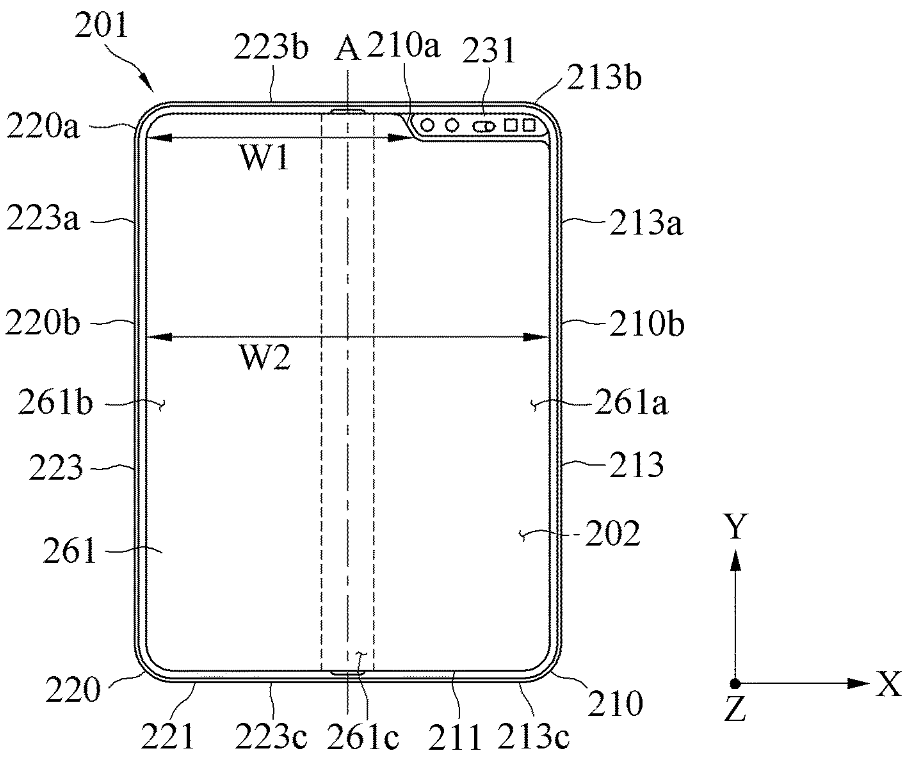
FIG. 2A is a plane view of an embodiment of an electronic device.
Figure 2B:
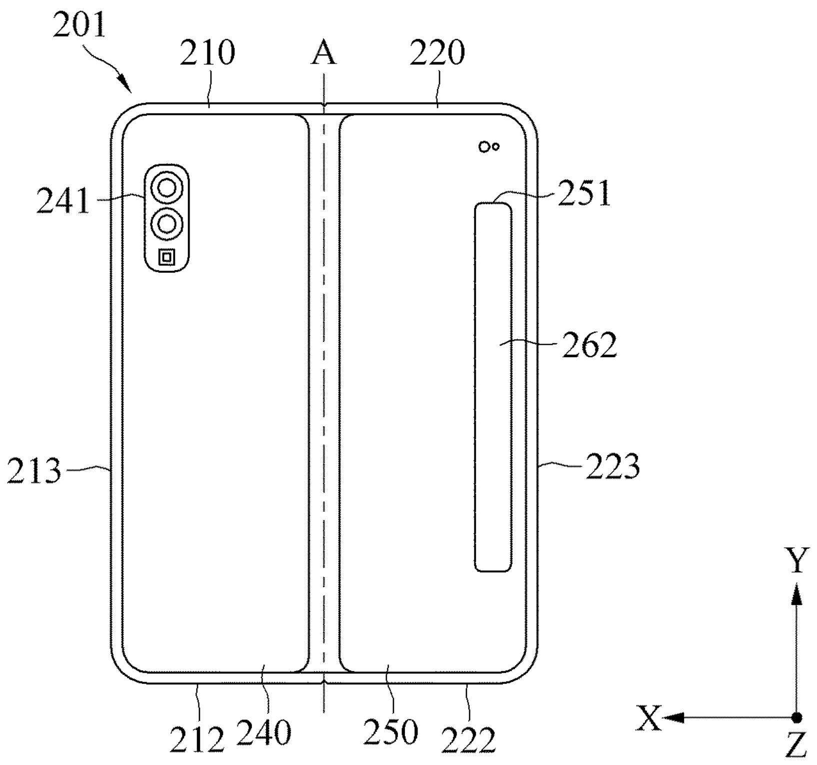
FIG. 2B is a rear view of an embodiment of an electronic device.
Figure 2C:
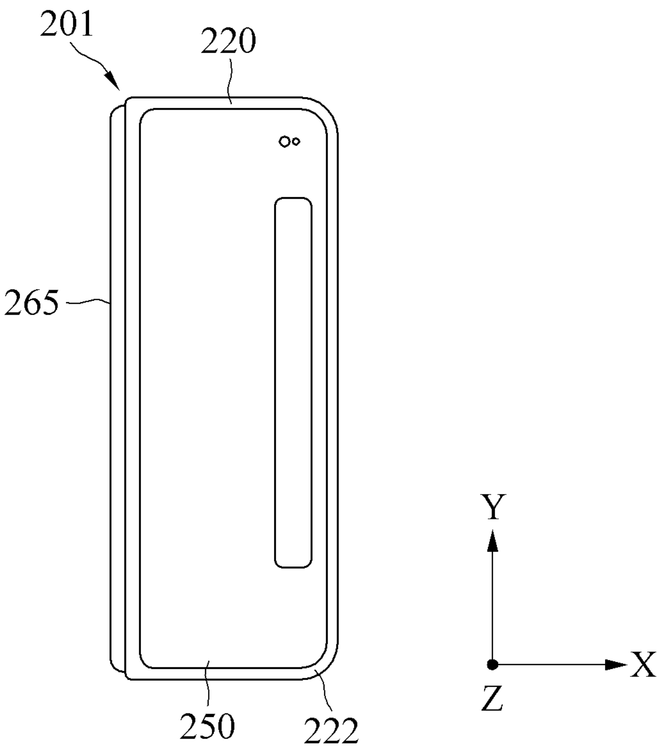
FIG. 2C is a plan view of an embodiment of an electronic device.
Figure 2D:
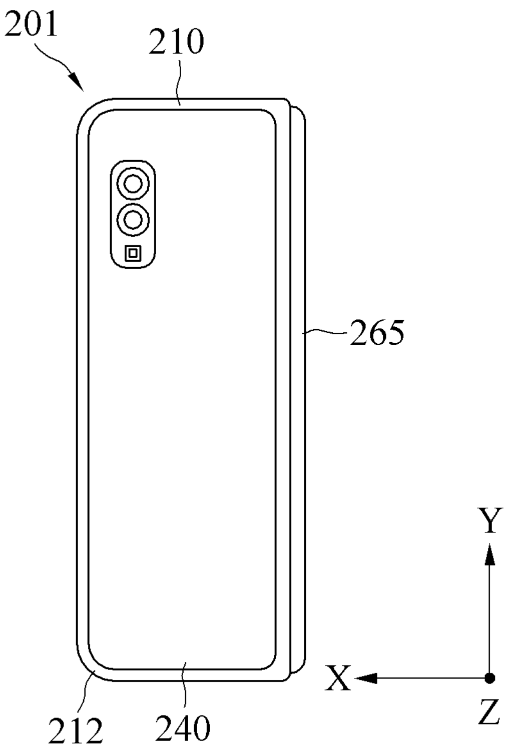
FIG. 2D is a rear view of an embodiment of an electronic device.
Figure 2E:
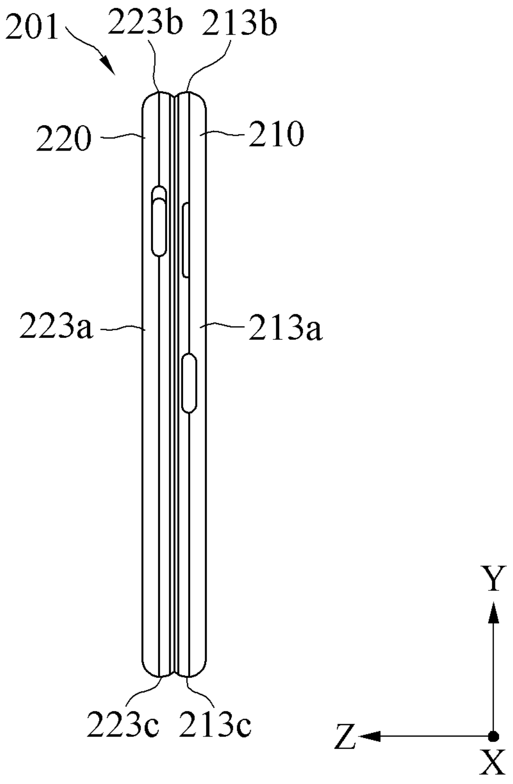
FIG. 2E is a side view of an embodiment of an electronic device.

FIG. 2A is a plan view of an embodiment of an electronic device, FIG. 2B is a rear view of an embodiment of an electronic device, FIG. 2C is a plan view of an embodiment of an electronic device, FIG. 2D is a rear view of an embodiment of an electronic device, and FIG. 2E is a side view of an electronic device.

Specifically, FIGS. 2A and 2B show an electronic device 201 in an unfolded state, and FIGS. 2C to 2E show the electronic device 201 in a folded state. In an embodiment, the electronic device 201 may be folded in a folding direction or unfolded in an unfolding direction, and such an electronic device 201 may also be also referred to as a "foldable device." Although a foldable device will be described hereinafter as an embodiment of the electronic device 201, the electronic device 201 is not limited to this example in actual implementations, and various examples may also be applicable.

Referring to FIGS. 2A to 2E, in an embodiment, the electronic device 201 may include a pair of housings 210 and 220 rotatably or movably coupled to each other through a hinge unit (e.g., a hinge unit 303 in FIG. 3A) so as to be folded against each other, a hinge housing 265 covering a foldable portion of the pair of housings 210 and 220, and a display (e.g., display panel) 261 (e.g., a flexible display or foldable display) disposed in a space formed by the pair of housings 210 and 220. A surface on which the display 261 is disposed may be defined herein as the front of the electronic device 201, and a surface opposite to the front may be defined herein as the back or rear of the electronic device 201. In addition, a surface surrounding a space between the front and the back may be defined herein as the side of the electronic device 201.

In an embodiment, the pair of housings 210 and 220 may include a first housing 210 including a sensor area 231, a second housing 220, a first rear cover 240, and a second rear cover 250. In an embodiment, the first housing 210 may support a first area 261*a*, and the second housing 220 may include a second area 261*b*. The pair of housings 210 and 220 of the electronic device 201 is not limited to the shape or the combination and/or coupling of parts or components shown in FIGS. 2A to 2E but may be implemented by other shapes or other combinations and/or couplings of parts or components.

In an embodiment, the first housing 210 and the second housing 220 may disposed on opposite sides with respect to a folding axis A and may be disposed substantially symmetrically with respect to the folding axis A. In an embodiment, an angle or distance formed between the first housing 210 and the second housing 220 may depend on whether the electronic device 201 is in an unfolded state, a folded state, or an intermediate state.

In an embodiment, unlike the second housing 220, the first housing 210 may include the sensor area 231 in which various sensor modules (e.g., the sensor module 176 in FIG. 1) are disposed, but in other portions excluding this, the first housing 210 and the second housing 220 may have a mutually symmetrical shape. In some embodiments, the sensor area 231 may be disposed in at least a portion of the second housing 220. In some embodiments, the sensor area 231 may be replaced with at least a portion of the second housing 220. The sensor area 231 may include a camera hole area, a sensor hole area, an under-display camera (UDC) area, and/or an under-display sensor (UDS) area, for example.

In an embodiment, the hinge unit 303 may be connected to the first housing 210 and the second housing 220, and adapted to operate between the folded state in which the first area 261*a* and the second area 261*b* face each other and the unfolded state in which the first area 261*a* and the second area 261*b* are open.

In an embodiment, the electronic device 201 may operate in an in-folding manner and/or out-folding manner as the first housing 210 is rotated in a range between 0 degrees and 360 degrees with respect to the second housing 220 through the hinge unit 303.

In an embodiment, the hinge unit 303 may be formed vertically or horizontally, when the electronic device 201 is viewed from above. In an embodiment, the hinge unit 303 may be provided in plural so that a plurality of hinge units 303 may be provided. In an embodiment, the plurality of hinge units 303 may all be disposed in the same direction, for example. In another embodiment, some of the hinge units 303 among the plurality of hinge units 303 may be disposed in different directions to be folded.

In an embodiment, the first housing 210 may be connected to the hinge unit 303 when the electronic device 201 is in the unfolded state. The first housing 210 may include a first surface 211 disposed to face the front of the electronic device 201, a second surface 212 facing in an opposite direction of the first surface 211, and a first side portion 213 surrounding at least a portion of a space between the first surface 211 and the second surface 212. The first side portion 213 may include a first side surface 213*a* disposed substantially parallel to the folding axis A, a second side surface 213*b* extending from one end of the first side surface 213*a* in a direction substantially perpendicular to the folding axis A, and a third side surface 213*c* extending from an opposite end of the first side surface 213*a* in a direction substantially perpendicular to the folding axis A and substantially parallel to the second side surface 213*b*. The second housing 220 may be connected to the hinge unit 303 when the electronic device 201 is in the unfolded state. The second housing 220 may include a third surface 221 disposed to face the front of the electronic device 201, a fourth surface 222 facing in an opposite direction of the third surface 221, and a second side portion 223 surrounding at least a portion of a space between the third surface 221 and the fourth surface 222. The second side portion 223 may include a fourth side surface 223*a* disposed substantially parallel to the folding axis A, a fifth side surface 223*b* extending from one end of the fourth side surface 223*a* in a direction substantially perpendicular to the folding axis A, and a sixth side surface 223*c* extending from an opposite end of the fourth side surface 223*a* in a direction substantially perpendicular to the folding axis A and substantially parallel to the fifth side surface 223*b*. The first surface 211 and the third surface 221 may face each other when the electronic device 201 is in the folded state.

In an embodiment, the electronic device 201 may include a recess-shaped receiving portion 202 that receives therein the display 261 through a structural coupling of the first housing 210 and the second housing 220. The receiving portion 202 may have substantially the same size as the display 261. In an embodiment, due to the sensor area 231, the receiving portion 202 may have two or more different widths in a direction perpendicular to the folding axis A. In an embodiment, the receiving portion 202 may have a first width W1 between a first portion 210*a* of the first housing 210 formed at an edge of the sensor area 231 and a second portion 220*a* of the second housing 220 parallel to the folding axis A, and a second width W2 between a third portion 210*b* of the first housing 210 that is parallel to the folding axis A without overlapping the sensor area 231 and a fourth portion 220*b* of the second housing 220, for example. In this case, the second width W2 may be greater than the first width W1. That is, the receiving portion 202 may be formed to have the first width W1 from the first portion 210*a* of the first housing 210 to the second portion 220*a* of the second housing 220 and the second width W2 from the third portion 210*b* of the first housing 210 to the fourth portion 220*b* of the second housing 220, which have a mutually asymmetrical shape. The first portion 210*a* and the third portion 210*b* of the first housing 210 may be formed at different distances from the folding axis A. However, the width of the receiving portion 202 may not be limited to the illustrated example. In an embodiment, the receiving portion 202 may have three or more different widths depending on the shape of the sensor area 231 or the asymmetrical shape of the first housing 210 and the second housing 220, for example.

In an embodiment, at least a portion of the first housing 210 and the second housing 220 may include or consist of a metallic material or a non-metallic material having the rigidity suitable for supporting the display 261.

In an embodiment, the sensor area 231 may be adjacent to one corner of the first housing 210. However, the arrangement, shape, or size of the sensor area 231 may not be limited to the illustrated example. In some embodiments, the sensor area 231 may be formed at another corner of the first housing 210 or in any area between upper and lower corners. In some embodiments, the sensor area 231 may be disposed in at least a portion of the second housing 220. In some embodiments, the sensor area 231 may be formed in a shape extending between the first housing 210 and the second housing 220.

In an embodiment, the electronic device 201 may include at least one component for performing various functions, which is disposed to be exposed to the front of the electronic device 201 through the sensor area 231 or through at least one opening defined in the sensor area 231. The component may include at least one of a front camera module, a receiver, a proximity sensor, an illumination sensor, an iris recognition sensor, an ultrasonic sensor, or an indicator, for example.

In an embodiment, the first rear cover 240 may be disposed on the second surface 212 of the first housing 210 and may have substantially quadrangular edges, e.g., rectangular edges. At least a portion of the edges of the first rear cover 240 may be surrounded by the first housing 210. The second rear cover 250 may be disposed on the fourth surface 222 of the second housing 220 and may have substantially quadrangular edges, e.g., rectangular edges. At least a portion of the edges of the second rear cover 250 may be surrounded by the second housing 220.

In an embodiment, the first rear cover 240 and the second rear cover 250 may have a substantially symmetrical shape with respect to the folding axis A. In another embodiment, the first rear cover 240 and the second rear cover 250 may have different shapes. In another embodiment, the first housing 210 and the first rear cover 240 may be unitary, and the second housing 220 and the second rear cover 250 may be unitary.

In an embodiment, the first housing 210, the second housing 220, the first rear cover 240, and the second rear cover 250 may be coupled to each other to provide a space in which various components (e.g., a PCB, the antenna module 197 in FIG. 1, the sensor module 176 in FIG. 1, or the battery 189 in FIG. 1) of the electronic device 201 are to be disposed. In an embodiment, at least one component may be visually exposed on the rear of the electronic device 201. In an embodiment, at least one component may be visually exposed through a first rear area 241 of the first rear cover 240, for example. In this case, the component may include a proximity sensor, a rear camera module, and/or a flash. In an embodiment, at least a portion of a sub-display 262 may be visually exposed through a second rear area 251 of the second rear cover 250. In an embodiment, the electronic device 201 may include a sound output module (e.g., the sound output module 155 in FIG. 1) disposed through at least a partial area of the second rear cover 250.

In an embodiment, the display 261 may be disposed in the receiving portion 202 formed by the pair of housings 210 and 220. In an embodiment, the display 261 may be disposed to occupy substantially most of the front of the electronic device 201, for example. The front of the electronic device 201 may include an area in which the display 261 is disposed, and a partial area (e.g., an edge area) of the first housing 210 and a partial area (e.g., an edge area) of the second housing 220 that are adjacent to the display 261. The rear of the electronic device 201 may include the first rear cover 240, a partial area (e.g., an edge area) of the first housing 210 adjacent to the first rear cover 240, the second rear cover 250, and a partial area (e.g., an edge area) of the second housing 220 adjacent to the second rear cover 250.

In an embodiment, the display 261 may be a display in which at least a partial area may be deformed into a flat or curved surface. In an embodiment, the display 261 may include a folding area 261*c*, the first area 261*a* on a first side (e.g., a right side) with respect to the folding area 261*c*, and the second area 261*b* on a second side (e.g., a left side) with respect to the folding area 261*c*. The first area 261*a* may be disposed on the first surface 211 of the first housing 210, and the second area 261*b* may be disposed on the third surface 221 of the second housing 220. However, this areal division of the display 261 is provided only as one of embodiments, the display 261 may be divided into a plurality of areas depending on the structure or function of the display 261.

In an embodiment, as shown in FIGS. 2A and 2B, the display 261 may be divided into areas by the folding area 261*c* or the folding axis A extending parallel to a Y axis, but the display 261 may be divided into areas by another folding area (e.g., a folding area extending parallel to an X axis) or another folding axis (e.g., a folding axis parallel to the X-axis), for example. The areal division of the display 261 described above may only be a physical division by the pair of housings 210 and 220 and the hinge unit 303, and the display 261 may display substantially one screen through the pair of housings 210 and 220 and the hinge unit 303.

In an embodiment, the first area 261*a* may include a notch area formed along the sensor area 231 but may have a substantially symmetrical shape with the second area 261*b* in other areas. In another embodiment, the first area 261*a* and the second area 261*b* may have a substantially symmetrical shape with respect to the folding area 261*c*.

In an embodiment, the hinge housing 265 may be disposed between the first housing 210 and the second housing 220 and configured to cover the hinge unit 303. The hinge housing 265 may be hidden or exposed to the outside by at least a portion of the first housing 210 and the second housing 220 depending on an operating state of the electronic device 201. In an embodiment, as shown in FIGS. 2A and 2B, when the electronic device 201 is in the unfolded state, the hinge housing 265 may be hidden by the first housing 210 and the second housing 220 not to be exposed to the outside, for example. As shown in FIGS. 2C to 2E, when the electronic device 201 is in the folded state, the hinge housing 265 may be exposed to the outside between the first housing 210 and the second housing 220. In addition, when the electronic device 201 is in the intermediate state in which the first housing 210 and the second housing 220 form an angle with each other, at least a portion of the hinge housing 265 may be exposed to the outside between the first housing 210 and the second housing 220. In this case, an area of the hinge housing 265 exposed to the outside may be smaller than an area of the hinge housing 265 exposed to the outside when the electronic device 201 is in the folded state. In an embodiment, the hinge housing 265 may have a curved surface.

In an embodiment, regarding the operations of the electronic device 201, when the electronic device 201 is in the unfolded state (e.g., a state of the electronic device 201 shown in FIGS. 2A and 2B), the first housing 210 and the second housing 220 may form a first angle (e.g., about 180 degrees) with each other, and the first area 261*a* and the second area 261*b* of the display 261 may be oriented substantially in the same direction. The folding area 261*c* of the display 261 may be substantially on the same plane as that of the first area 261*a* and the second area 261*b*.

In another embodiment, when the electronic device 201 is in the unfolded state, as the first housing 210 rotates or moves at a second angle (e.g., about 360 degrees) with respect to the second housing 220, the first housing 210 and the second housing 220 may be folded in opposite directions such that the second surface 212 and the fourth surface 222 face each other. In addition, when the electronic device 201 is in the folded state (e.g., a state of the electronic device 201 shown in FIGS. 2C to 2E), the first housing 210 and the second housing 220 may face each other. The first housing 210 and the second housing 220 may form an angle of about 0 degrees to about 10 degrees, and the first area 261*a* and the second area 261*b* of the display 261 may face each other.

In an embodiment, at least a portion of the folding area 261*c* of the display 261 may be deformed into a curved surface. In addition, when the electronic device 201 is in the intermediate state, the first housing 210 and the second housing 220 may form a predetermined angle with each other. The angle (e.g., a third angle, about 90 degrees) formed between the first area 261*a* and the second area 261*b* of the display 261 may be greater than an angle defined when the electronic device 201 is in the folded state and may be smaller than an angle defined when the electronic device 201 is in the unfolded state. At least a portion of the folding area 261*c* of the display 261 may be deformed into a curved surface. In this case, a curvature of the curved surface of the folding area 261*c* may be smaller than a curvature of the curved surface of the folding area 261*c* formed when the electronic device 201 is in the folded state.

Embodiments of an electronic device described herein are not limited to the form factor of the electronic device 201 described above with reference to FIGS. 2A to 2E, and various form factors may also be applicable.

Figure 3A:
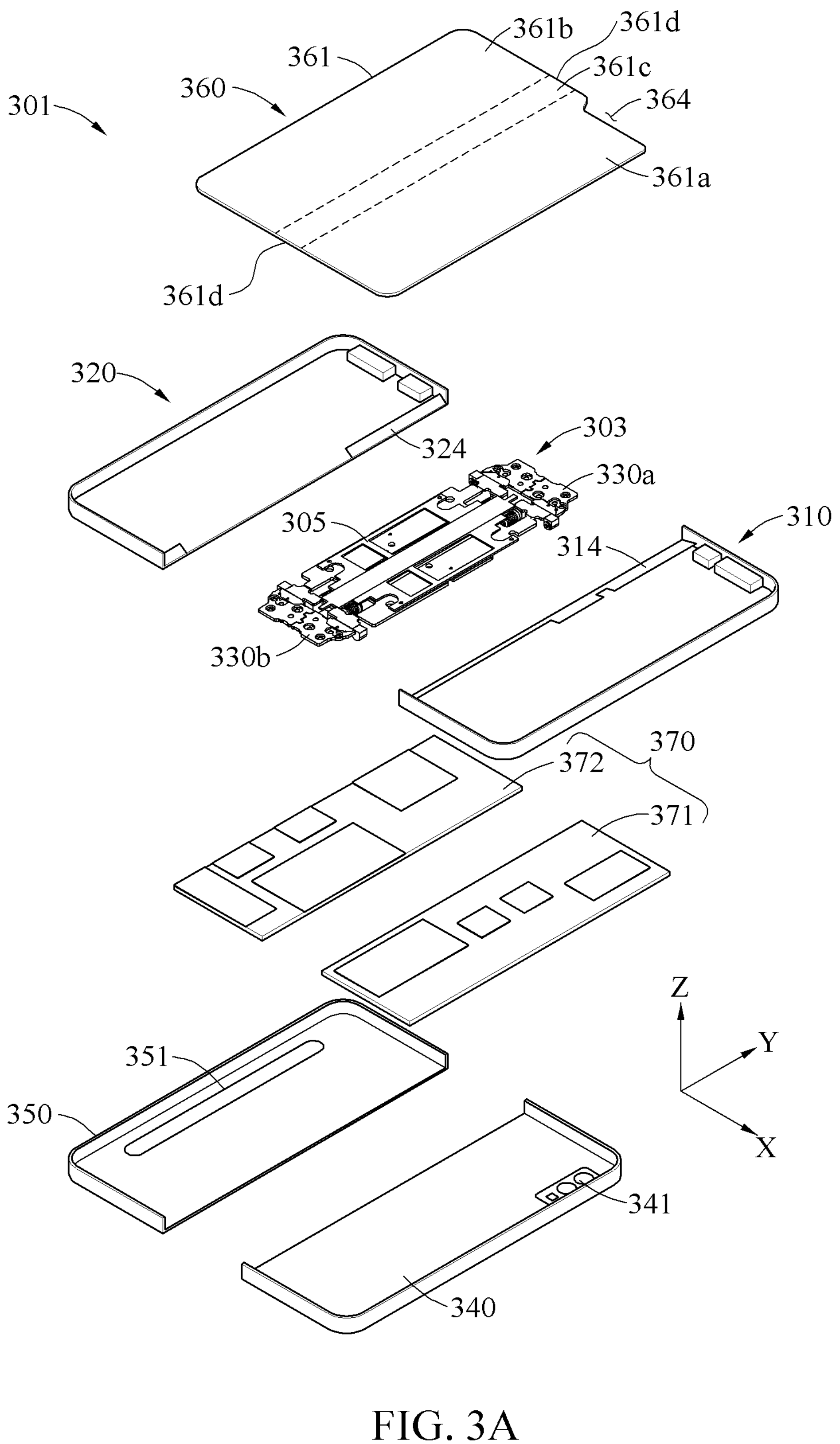
FIG. 3A is an exploded perspective view of an embodiment of an electronic device.
Figure 3B:
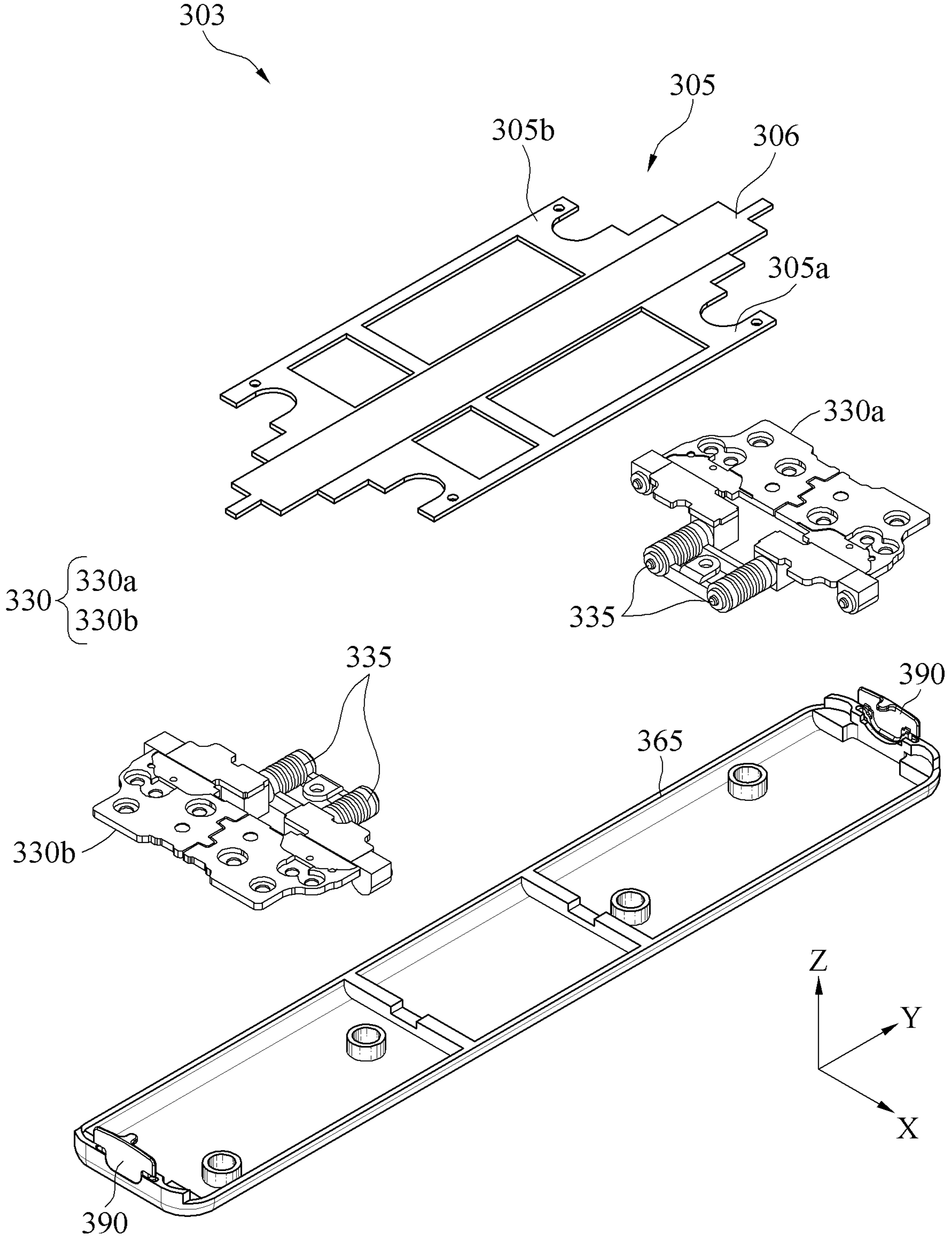
FIG. 3B is an exploded perspective view of an embodiment of a hinge unit.

FIG. 3A is an exploded perspective view of an embodiment of an electronic device, and FIG. 3B is an exploded perspective view of a hinge unit.

Referring to FIGS. 3A and 3B, in an embodiment, an electronic device 301 (e.g., the electronic device 101 in FIG. 1 and the electronic device 201 in FIGS. 2A to 2E) may include a display module 360 (e.g., the display module 160 in FIG. 1), a hinge unit 303, a substrate 370, a first housing 310 (e.g., the first housing 210 in FIG. 2A), a second housing 320 (e.g., the second housing 220 in FIG. 2A), a first rear cover 340 (e.g., the first rear cover 240 in FIG. 2B) including a first rear area 341 (e.g., the first rear area 241 in FIG. 2B), and a second rear cover 350 (e.g., the second rear cover 250 in FIG. 2B) including a second rear area 351 (e.g., the second rear area 251 in FIG. 2B).

In an embodiment, the display module 360 (e.g., the display 261 in FIG. 2A) may include a foldable display 361 having the flexibility to be folded or rolled at least partially. The display 361 may include a folding area 361*c*, a first area 361*a* on a first side (e.g., a right side or −X direction) with respect to the folding area 361*c*, and a second area 361*b* on a second side (e.g., a left side or +X direction) with respect to the folding area 361*c*. In various embodiments, in both directions (e.g., +/−Y direction) connecting the first side and the second side of the folding area 361*c*, that is, in both directions exposed to the outside without facing the first area 361*a* and the second area 361*b*, a side 361*d* may be formed, and the side 361*d* may be protected by a cap (e.g., a cap 390 in FIG. 4A).

In an embodiment, a notch area 364 may be defined in the first area 361*a* of the display 361 along a sensor area (e.g., the sensor area 231 in FIG. 2A), and the first area 361*a* excluding the notch area 364 may have a substantially symmetrical shape with the second area 361*b*.

In an embodiment, the first area 361*a* and the second area 361*b* may be unfolding areas that are distinguished from the folding area 361*c*, and may be rotated or moved in directions facing each other with respect to the folding area 361*c*. In an embodiment, as the folding area 361*c* is folded or unfolded in a folding direction (e.g., +Z direction) or unfolding direction (e.g., −Z direction), one surfaces (e.g., surfaces in the +Z direction) of the first area 361*a* and the second area 361*b* may move in directions facing each other or receding from each other, for example.

In an embodiment, the hinge unit 303 may include a hinge plate 305, a hinge assembly 330 disposed at both longitudinal ends of the hinge plate 305, and a hinge housing 365 (e.g., the hinge housing 265 in FIG. 2C) that covers at least a portion of the hinge assembly 330 when the hinge assembly 330 is viewed from outside.

In an embodiment, the hinge plate 305 may include a center plate 306 disposed horizontally to a folding axis (e.g., the folding axis A or the Y axis in FIG. 2A) of the hinge unit 303, and a first plate 305*a* and a second plate 305*b* that are disposed on opposite sides (e.g., +/−Y direction) with respect to the center plate 306 to be rotated or moved. In an embodiment, the center plate 306 may be fixed to the hinge unit 303, and the first plate **305*a* and the second plate 305*b* may be rotated or moved by a gear 335 of the hinge unit 303** to fold other parts or components.

In an embodiment, the first plate **305*a* and the second plate 305*b* may each be coupled to one of the first housing 310 and the second housing 320, and the first plate 305*a* and the second plate 305*b* may rotate or move the first housing 310 and the second housing 320** while supporting them, for example.

In an embodiment, the hinge assembly 330 may include a first hinge assembly **330*a* disposed on one side (e.g., +Y direction) of the hinge plate 305 and a second hinge assembly 330*b* disposed on an opposite side (e.g., −Y direction) of the hinge plate 305. In an embodiment, the first hinge assembly 330*a* and the second hinge assembly 330*b* may be disposed symmetrically with respect to an axis (e.g., an X-axis passing through the center of the hinge plate 305) that is perpendicular to the folding axis A and crosses the center of the hinge plate 305. The first hinge assembly 330*a* and the second hinge assembly 330*b* may each include a plurality of gears 335**.

In an embodiment, the plurality of gears 335 may be symmetrical with respect to the folding axis A. The plurality of gears 335 may be inserted into a gear shaft (not shown) to be rotated thereabout and may rotate the first plate **305*a* and the second plate 305*b* around the center plate 306**.

In an embodiment, the substrate 370 may include a first substrate 371 disposed on a side of a first bracket 331 and a second substrate 372 disposed on a side of a second bracket 332. The first substrate 371 and the second substrate 372 may be disposed inside a space formed by the hinge unit 303, the first housing 310, the second housing 320, the first rear cover 340, and the second rear cover 350. On the first substrate 371 and the second substrate 372, parts or components for implementing various functions of the electronic device 301 may be disposed (e.g., mounted).

In an embodiment, the first rear cover 340 may include the first rear area 341, and the second rear cover 350 may include the second rear area 351. In this case, various parts or components including the first substrate 371 may be disposed or coupled in the first rear area 341, and various parts or components including the second substrate 372 may be disposed or coupled in the second rear area 351. The first rear cover 340 and the second rear cover 350 may be respectively connected to the first housing 310 and the second housing 320 and may be rotatably connected to the hinge unit 303.

In an embodiment, the first housing 310 and the second housing 320 may be assembled with each other to be coupled to opposite sides of the hinge unit 303 with the display module 360 coupled to the hinge unit 303. The first housing 310 and the second housing 320 may be coupled to the hinge unit 303 by sliding on opposite sides of the hinge unit 303.

In an embodiment, the first housing 310 may include a first rotational support surface 314, and the second housing 320 may include a second rotational support surface 324 corresponding to the first rotational support surface 314. The first rotational support surface 314 and the second rotational support surface 324 may each include a curved surface corresponding to a curved surface included in the hinge housing 365 (e.g., the hinge housing 265 in FIG. 2C).

In an embodiment, when the electronic device 301 is in the unfolded state (e.g., the electronic device 201 in FIGS. 2A and 2B), the first rotational support surface 314 and the second rotational support surface 324 may cover the hinge housing 365, and thus the hinge housing 365 may not be exposed to the rear of the electronic device 301 or may be minimally exposed. In addition, when the electronic device 301 is in the folded state (e.g., the electronic device 201 in FIGS. 2C to 2E), the first rotational support surface 314 and the second rotational support surface 324 may be rotated along the curved surface included in the hinge housing 365, and thus the hinge housing 365 may be maximally exposed to the rear of the electronic device 301.

In an embodiment, the cap 390 may cover the side **361*d* of the folding area 361*c* of the display 361 and protect it from the outside. In an embodiment, the display 361 may include the side 361*d*, which is a portion of an outer side connected to the folding area 361*c*. The side 361*d* may connect a pair of boundaries connected to the first area 361*a* and the second area 361*b* of the folding area 361*c*** in both directions (e.g., +/−X direction or the folding direction and the unfolding direction).

In an embodiment, the cap 390 may be coupled to opposite ends of the hinge housing 365. In an embodiment, the electronic device 301 may include a plurality of caps 390. The folding area **361*c* of the display 361 may be disposed between the plurality of caps 390, and the plurality of caps 390 may cover the side 361*d* on opposite sides of the folding area 361*c*. The plurality of caps 390 may guide a movement range in which the folding area 361*c* moves and may protect foreign substances from being introduced into a gap generated as the folding area 361*c*** moves.

Figure 4A:
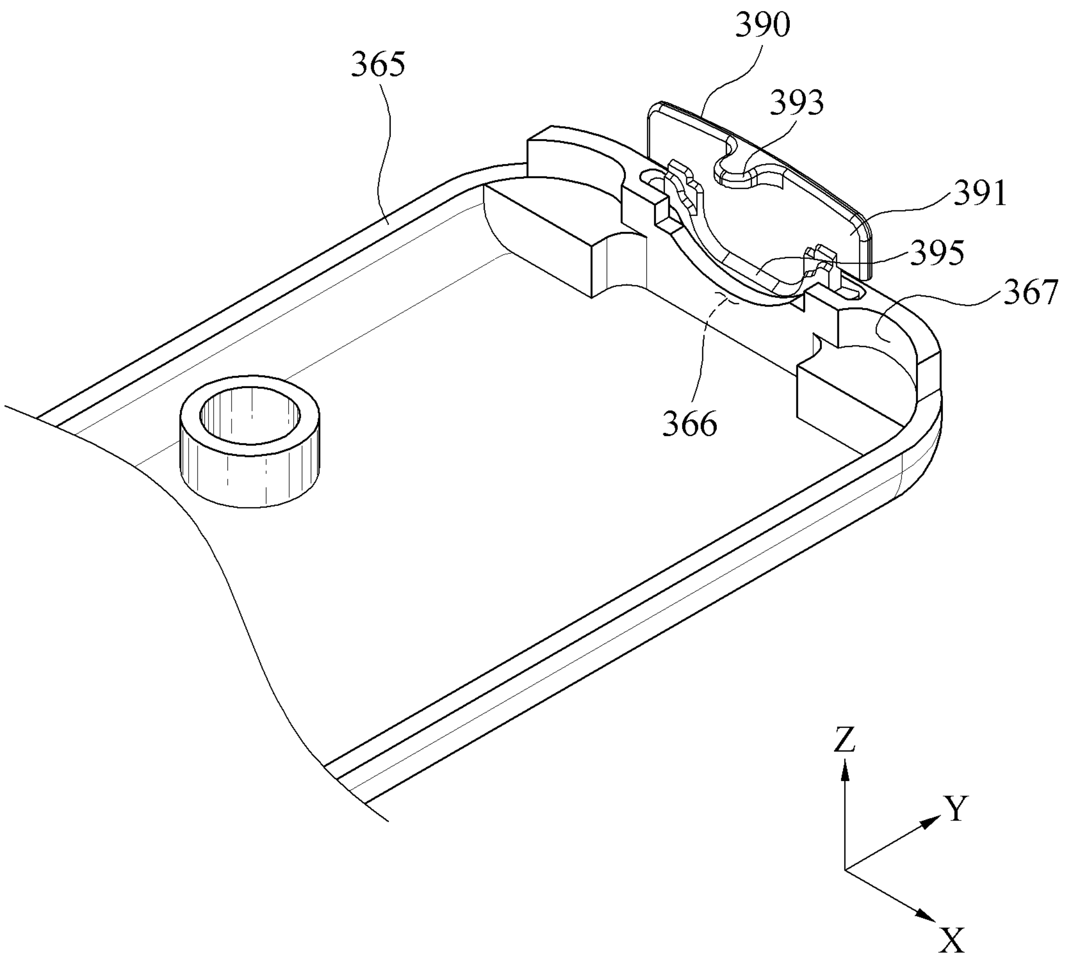
FIG. 4A is an enlarged perspective view of an embodiment of a hinge housing and a cap.
Figure 4B:
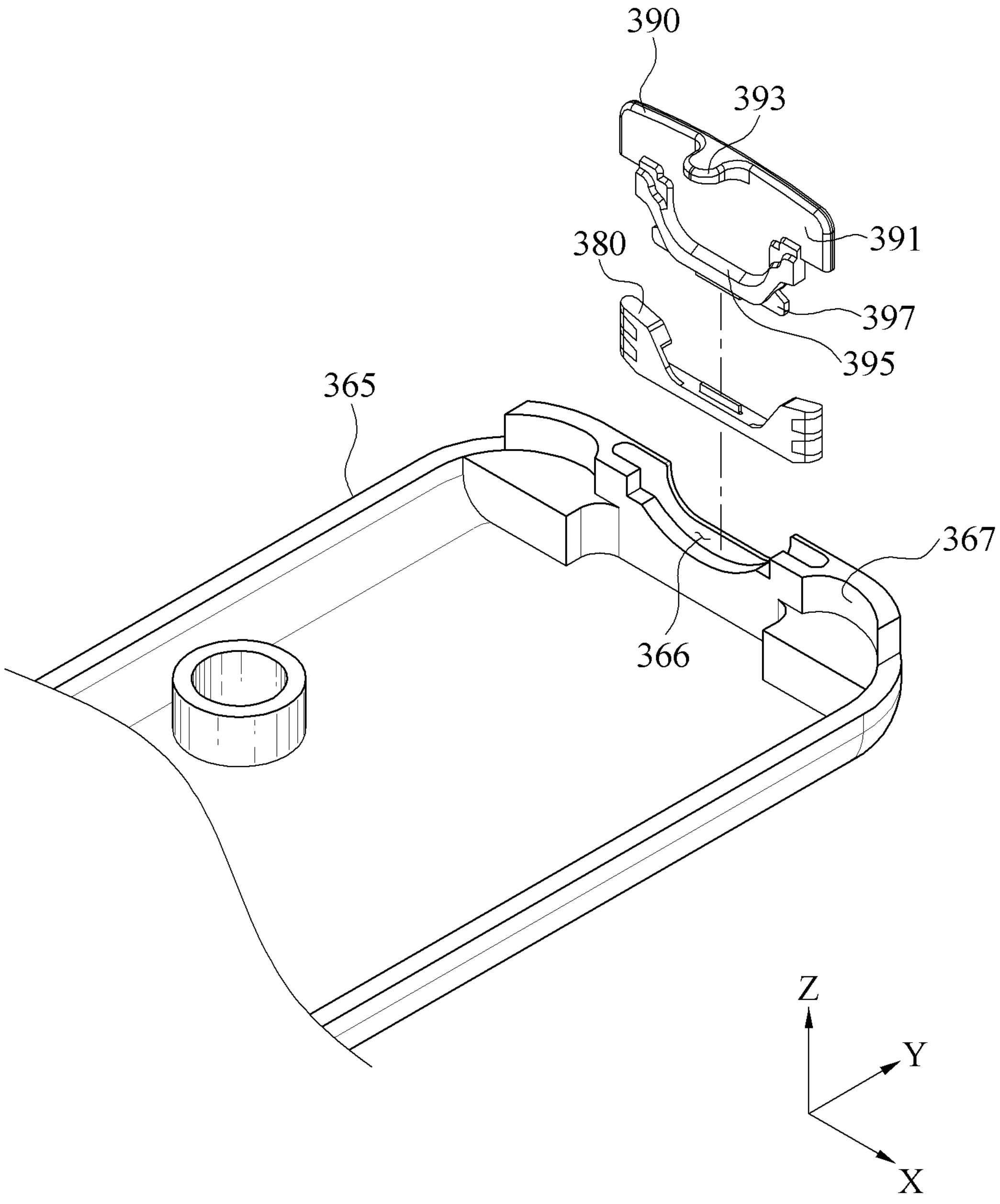
FIG. 4B is an exploded perspective view of an embodiment of a hinge housing and a cap.

FIG. 4A is an enlarged perspective view of an embodiment of the hinge housing 365 and the cap 390, and FIG. 4B is an exploded perspective view of an embodiment of the hinge housing 365 and the cap 390.

Referring to FIGS. 4A and 4B, in an embodiment, an electronic device (e.g., the electronic device 101 in FIG. 1, the electronic device 201 in FIGS. 2A to 2E, or the electronic device 301 in FIGS. 3A and 3B) may include a fixing member 380 and the cap 390.

Hereinafter, the cap 390 and the fixing member 380 that may be included in the electronic device 301 of the various embodiments described above with reference to FIGS. 1 to 3B will be described, with a repeated description thereof omitted.

In an embodiment, the cap 390 may be a protective cap or side cap for the side **361*d*, and the cap 390 may include or define at least some of a protective surface 391, a support protrusion 393, a support groove 395, and a hook 397. In an embodiment, the cap 390 may fill a void between a display (e.g., the display 361 in FIG. 3A) and the hinge housing 365, or may surround a side (e.g., the side 361*d* in FIG. 3A) of the display 361 to protect and/or support the display 361**.

In an embodiment, the protective surface 391 may be a surface facing a folding area (e.g., the folding area **361*c* in FIG. 3A) of the display 361 or a surface substantially horizontal to a plane (e.g., an X-Z plane) facing the side 361*d* of the folding area 361*c* of the display 361**.

In an embodiment, the support protrusion 393 and the support groove 395 may limit a movement range of the folding area **361*c* of the display 361. In an embodiment, the support groove 395 may be a groove structure in which the side 361*d* of the folding area 361*c* is seated, supporting the folding area 361*c*, in the folded state. In an embodiment, the support groove 395 may be a structure corresponding to the shape of the folding area 361*c* in the folded state, and may be formed such that a portion protrudes or is recessed from the protective surface 391**.

In an embodiment, the support protrusion 393 may guide the folding area 361*c* not to be curved or protrude in a screen display direction (e.g., +Z direction), in the unfolded state. The support protrusion 393 may be formed by protruding in a direction from the protective surface 391 to the folding area 361*c*.

In an embodiment, the hook 397 may protrude outwardly from the protective surface 391 such that the hook 397 may be fastened to another support, e.g., a hook groove (e.g., a hook groove 382 in FIG. 5) of the fixing member 380 to fix the cap 390 and the fixing member 380.

In an embodiment, the fixing member 380 may fix the cap 390 to the hinge housing 365. In various embodiments, a fixing groove 366 into which the fixing member 380 is inserted (or retracted) and fixed may be defined in the hinge housing 365, and the fixing member 380 may be inserted and fixed into the fixing groove 366 of the hinge housing 365.

In an embodiment, the fixing groove 366 may be provided in plural and a plurality of fixing grooves may be spaced apart at ends in both directions (e.g., +/−Y direction) to face opposite sides 361*d* of the folding area 361*c*, in the hinge housing 365. The fixing member 380 may be provided in plural and a plurality of fixing members may be inserted respectively into the plurality of fixing grooves 366, and the folding area 361*c* of the display 361 may be disposed between the plurality of fixing members 380.

In an embodiment, the hook groove 382 to which the hook 397 of the cap 390 is fastened may be defined in a fixing part 381, and the fixing part 381 may connect the cap 390 and the fixing member 380. In an embodiment, the fixing member 380 may include a fixing part (e.g., the fixing part 381 in FIG. 5) that supports the cap 390 and forms a body and a wing part (e.g., a wing part 385 in FIG. 5) that fixes the fixing part 381 inside the fixing groove 366.

In an embodiment, the fixing groove 366 may be provided at opposite ends to correspond to the sides 361*d* of the folding area 361*c* in the hinge housing 365. The hinge housing 365 may have a stepped area 367 to reinforce the height (e.g., a length in the +Z direction) of the fixing groove 366, and the fixing groove 366 may be defined as it is open in an inward direction (e.g., −Z direction) of the hinge housing 365 from the stepped area 367.

In an embodiment, the cap 390 and the fixing member 380 may include or consist of different materials from each other. In an embodiment, the cap 390 may include or consist of a relatively more rigid material compared to the fixing member 380 to support and protect the display 361. In an embodiment, the fixing member 380 may include or consist of a relatively more elastic material compared to the cap 390 to respond to a change in shape occurring as it is inserted into the fixing groove 366 and to form a fixing force by receiving a pressure.

In an embodiment, the cap 390 and the fixing member 380 may be separately formed such that the cap 390 protects the display 361 and the fixing member 380 structurally fixes the cap 390 to the hinge housing 365, and the cap 390 may be fixed to the hinge housing 365 easily and stably without an adhesive material (not shown) for the electronic device 301.

In another embodiment, in a case where the cap 390 and the fixing member 380 are formed as a single body and are both including or consisting of a highly elastic material, the cap 390 may be deformed by an external force generated from inside or outside the electronic device 301, and the cap 390 may become relatively less durable than a rigid material.

In another embodiment, in a case where the cap 390 and the fixing member 380 are formed as a single body and are both including or consisting of a highly rigid material, it may be desired to apply an adhesive material (not shown), such as a bond, for the fixing member 380 to be fixed to the hinge housing 365. The electronic device 301 may need to pass through at least some of processes for fixing the cap 390, such as, e.g., a process of applying a bond to the fixing groove 366 or the fixing member 380, a process of fastening a clamping jig, or a process of hardening the bond by waiting for a period of time. These processes may complicate a manufacturing process of the electronic device 301, produce defects in the manufacturing process, and reduce manufacturing efficiency.

For the cap 390 and the fixing member 380 in various embodiments described herein, the cap 390 may include or consist of a material with relatively high rigidity to stably support and protect the display 361, and the fixing member 380 may include or consist of a material with relatively high elasticity to simply and easily be inserted into the fixing groove 366 to fix the cap 390 therein.

Hereinafter, features of the fixing member 380 in various embodiments will be described with reference to the accompanying drawings. However, these are provided only for illustrative purposes, and actual implementations are not limited to these and may employ various structures and materials.

Figure 5:
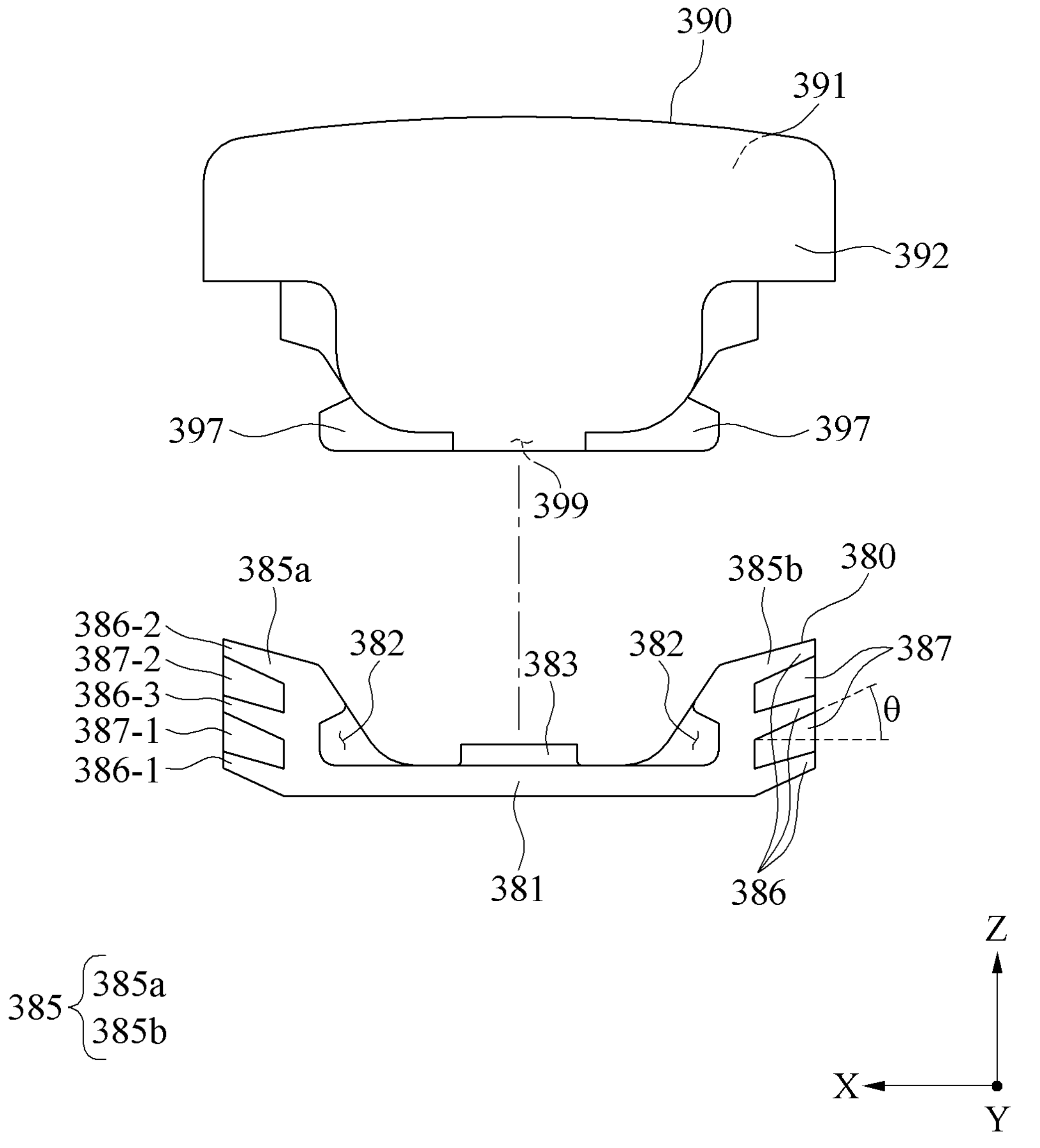
FIG. 5 is an exploded view of an embodiment of a cap and a fixing member.

FIG. 5 is an exploded view of an embodiment of the cap 390 and the fixing member 380.

Referring to FIG. 5, the wing part 385 of the fixing member 380 may extend to be inclined at a predetermined angle, and the fixing member 380 may include an elastic member 387.

In an embodiment, the cap 390 may include an outer surface 392 opposite the protective surface 391. The outer surface 392 may be an externally exposed area of the electronic device 301 and may protect the display 361 by absorbing an impact from the outside.

In an embodiment, the fixing member 380 may include a fastening protrusion 383 that protrudes toward the cap 390, and a fastening groove 399 to which the fastening protrusion 383 is fastened may be defined in the cap 390. In various embodiments, the fastening protrusion 383 and the fastening groove 399, along with the hook 397 and the hook groove 382, may connect the cap 390 and the fixing member 380 such that the cap 390 is stably fixed into the fixing member 380.

In an embodiment, at least one hook groove 382 may be provided. In an embodiment, the hook groove 382 may be defined in each of opposite sides of the fixing part 381. In another embodiment, the hook groove 382 may be defined in either one of the sides of the fixing part 381.

In an embodiment, the hook groove 382 may be defined in an inner space of the fixing member 380. In another embodiment, the hook groove 382 may be defined in an outer surface of the fixing member 380.

In an embodiment, the hook 397 may be provided in plural and a plurality of hooks may protrude in both directions (e.g., +/−X direction) from a bottom surface of the cap 390, and the fastening groove 399 may be defined between the plurality of hooks 397. The hook 397 may fix the cap 390 such that the cap 390 does not depart from the fixing member 380 in an upward direction (e.g., +Z direction). In an embodiment, the fastening protrusion 383 may be inserted into the fastening groove 399 to fix the cap 390 such that the cap 390 does not depart from the fixing member 380 in a front and back direction (e.g., +/−Y direction).

In an embodiment, the wing part 385 of the fixing member 380 may be formed to protrude from the fixing part 381 such that its end contacts the fixing groove 366. The wing part

385 may support the fixing member 380 such that the fixing member 380 does not easily depart from the fixing groove 366 when the fixing member 380 is inserted into the fixing groove 366.

In an embodiment, the wing part 385 may extend to be inclined at a predetermined angle θ relative to a bottom surface of the fixing part 381. In an embodiment, the bottom surface of the fixing part 381 may be a plane (e.g., an X-Y plane) that is horizontal to a screen of the display 361 in the unfolded state, allowing the wing part 385 to extend to be inclined at the predetermined angle θ in an up and down direction (e.g., +/−Z direction) from the bottom surface, for example.

In an embodiment, as the wing part 385 extends to be inclined from the fixing part 381, a more force may be desired in a motion of the fixing member 380 departing from the fixing groove 366 compared to a motion of the fixing member 380 being inserted or retracted into the fixing groove 366.

In an embodiment, the fixing member 380 may extend to be inclined in a direction from the fixing part 381 toward a direction opposite to a direction (e.g., −Z direction) in which the fixing member 380 is inserted into the fixing groove 366, for example. In this case, for the fixing member 380 to be inserted into the fixing groove 366, the wing part 385 may receive an external force in a direction in which it extends to be more easily deformed, or the wing part 385 may receive a relatively small external force. In contrast, to separate the fixing member 380 from the fixing groove 366, the wing part 385 may receive an external force in a direction opposite the direction in which it extends and may not be easily deformed, or the wing part 385 may receive a relatively large external force.

In an embodiment, although not shown in the drawings, the fixing groove 366 may have a concavo-convex structure corresponding to the inclined structure of the wing part 385. In another embodiment, in a case where the fixing groove 366 is defined substantially flat, it may only contact ends of opposite sides (e.g., +/−X direction) of the wing part 385. In a case where the fixing groove 366 is concavo-convex or bent to correspond to the structure of the wing part 385, in addition to the side ends of the wing part 385, a top surface or an inclined surface of the wing part 385 may also contact the fixing groove 366, and the fixing groove 366 may thus limit a movement of the wing part 385 in relatively more directions.

In an embodiment, the wing part 385 may include a first wing part **385*a* and a second wing part 385*b* that extend from the fixing part 381 in different directions, respectively. In an embodiment, the first wing part 385*a* may protrude in a direction from the fixing part 381 toward a first area (e.g., the first area 361*a* in FIG. 3A) in the unfolded state, and the second wing part 385*b* may protrude in a direction from the fixing part 381 toward a second area (e.g., the second area 361*b* in FIG. 3**A) in the unfolded state, for example.

In an embodiment, the first wing part **385*a* and the second wing part 385*b* may extend in different directions and may contact the fixing groove 366 in different directions. In an embodiment, the first wing part 385*a* may extend in a direction (e.g., +X direction) toward a first housing (e.g., the first housing 310 in FIG. 3A) or toward the first area 361*a* of the display 361, for example. The second wing part 385*b* may extend in a direction opposite the first wing part 385*a*, or in another direction (e.g., −X direction) toward a second housing (e.g., the second housing 320 in FIG. 3A) or toward the second area 361*b* of the display 361**.

In an embodiment, the first wing part **385*a* and the second wing part 385*b* may contact the fixing groove 366 in both directions (e.g., +/−X direction), and may complement each other to prevent the fixing member 380 from departing in either one of the directions, adjust a balance on opposite sides of the fixing member 380, and allow the wing part 385 to stably support the fixing member 380 in the fixing groove 366**.

In an embodiment, the wing part 385 may include a plurality of sub-wings 386 spaced apart in an up and down direction (e.g., +/−Z direction), and the elastic member 387 may be provided between the plurality of sub-wings 386. In an embodiment, the plurality of sub-wings 386 may include a lower sub-wing 386-1 connected to the bottom surface of the fixing part 381, an upper sub-wing 386-2 connected to a top surface of the fixing part 381, and a middle sub-wing 386-3 disposed between the lower sub-wing 386-1 and the upper sub-wing 386-2.

In an embodiment, the fixing member 380 may be disposed or filled between the plurality of sub-wings 386. In an embodiment, the fixing member 380 may include a first elastic member 387-1 disposed or filled between the lower sub-wing 386-1 and the middle sub-wing 386-3, and a second elastic member 387-2 disposed or filled between the upper sub-wing 386-2 and the middle sub-wing 386-3, for example.

In an embodiment, the wing part 385 may include the plurality of sub-wings 386 that are spaced apart at predetermined intervals in an insertion direction (e.g., −Z direction) in which the fixing member 380 is inserted into the fixing groove 366. In various embodiments, the fixing member 380 may include the elastic member 387 filled between the plurality of sub-wings 386.

In various embodiments, the middle sub-wing 386-3 may support the first elastic member 387-1 and the second elastic member 387-2 therebetween to reinforce the rigidity for the fixing member 380 that may have insufficient rigidity by the first elastic member 387-1 and the second elastic member 387-2.

However, the structure and shape of the plurality of sub-wings 386 and the elastic member 387 are not limited thereto and may be implemented in various ways. The structure of the wing part 385 of the fixing member 380 in an embodiment will be described in detail below with reference to FIG. 7A and the following drawings.

Figure 6A:
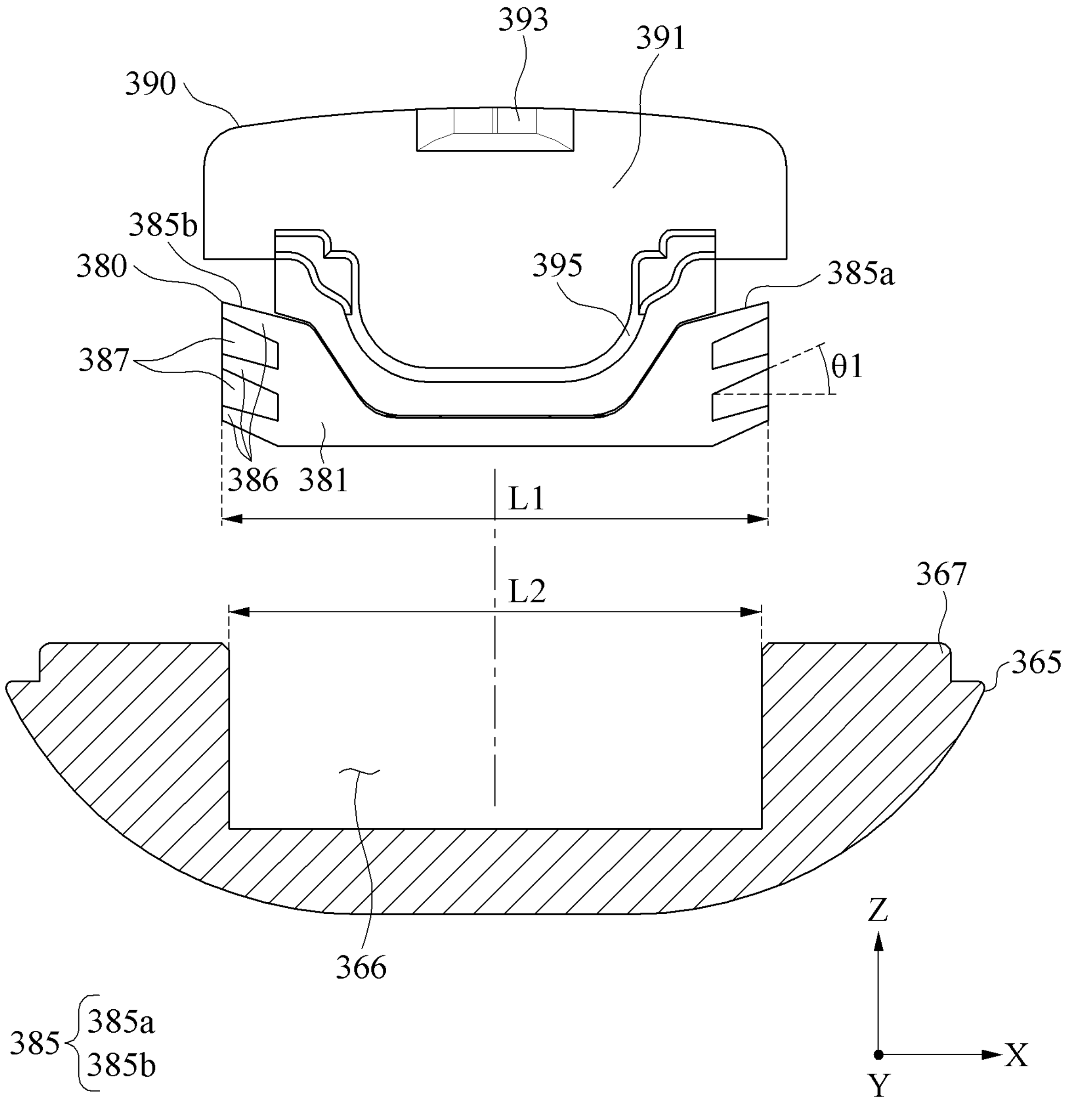
FIG. 6A illustrates a separated state of an embodiment of a hinge housing and a fixing member.
Figure 6B:
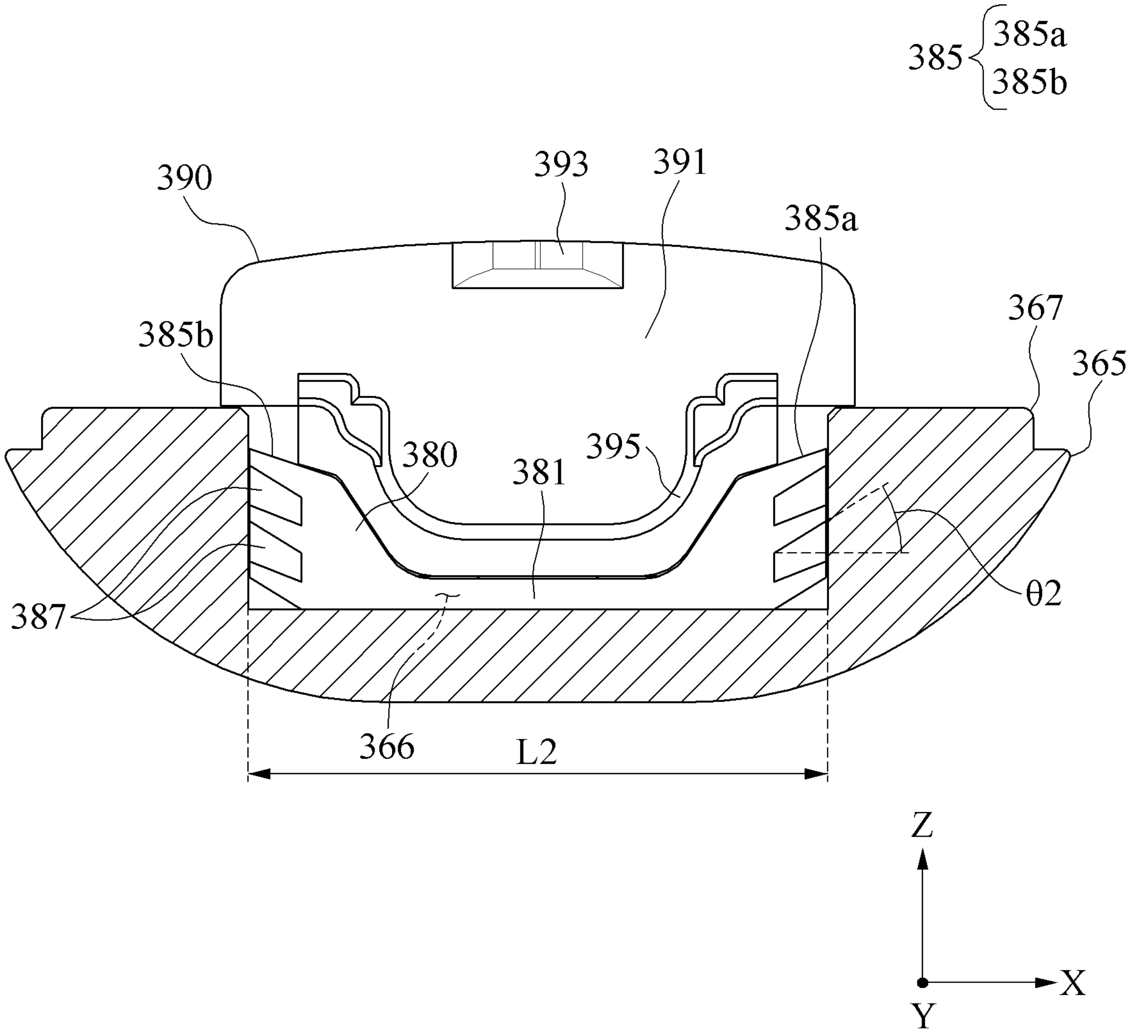
FIG. 6B illustrates a coupled state of an embodiment of a hinge housing and a fixing member.
Figure 6C:
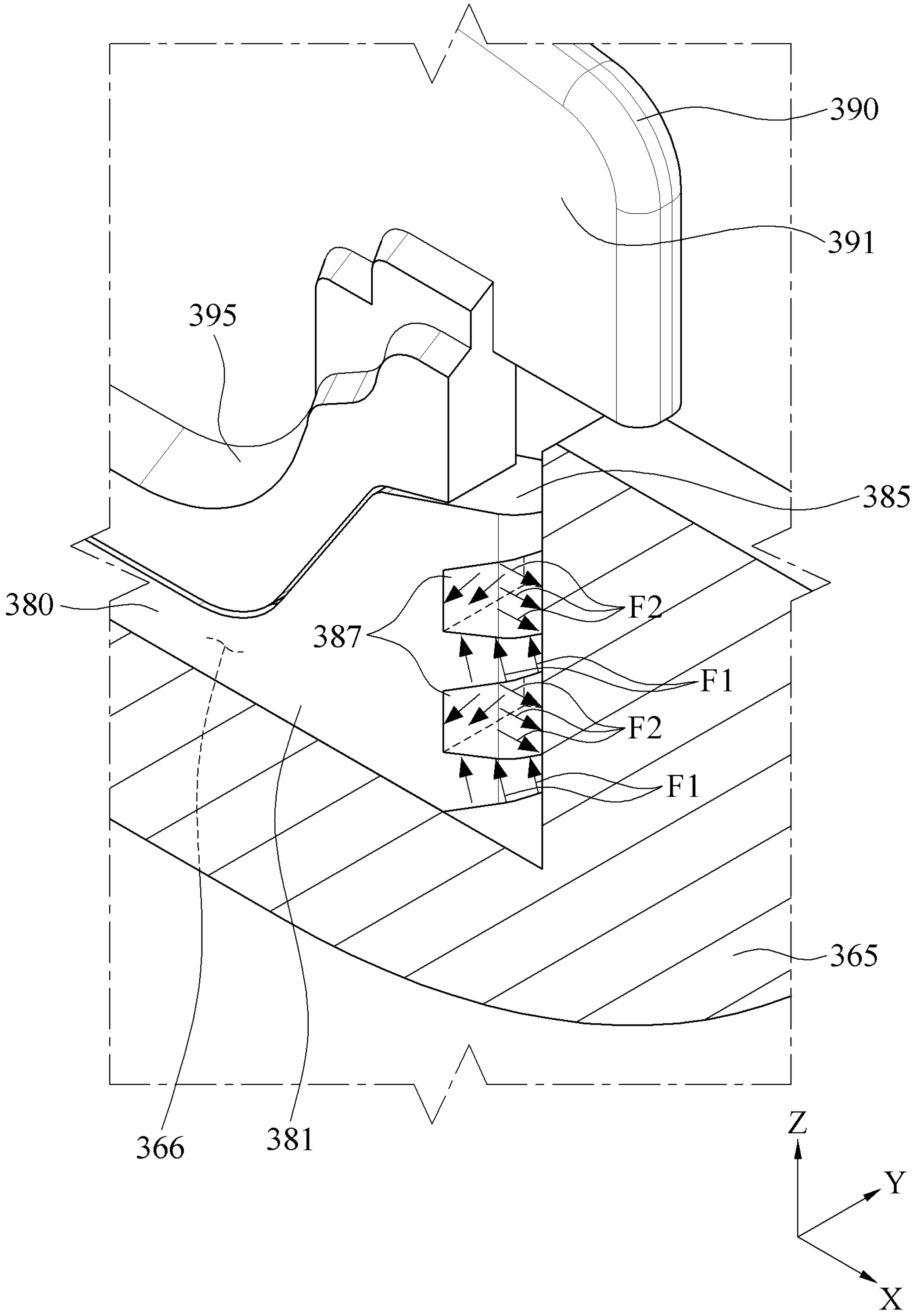
FIG. 6C is an enlarged perspective view of an embodiment of a hinge housing and a fixing member in a coupled state.

FIG. 6A illustrates an embodiment of a separated state in which the hinge housing 365 and the fixing member 380 are separated from each other, FIG. 6B illustrates an embodiment of a coupled state in which the hinge housing 365 and the fixing member 380 are coupled to each other, and FIG. 6C is an enlarged perspective view of an embodiment of the hinge housing 365 and the fixing member 380 in the coupled state.

Referring to FIGS. 6A to 6C, the fixing member 380 in an embodiment may include the elastic member 387.

In an embodiment, the fixing member 380 may be formed to have a first length L1, which is a length from an end of the first wing part **385*a* to an end of the second wing part 385*b*, based on a separated state in which it is separated from the fixing groove 366. In an embodiment, the fixing groove 366 may be defined to have a second length L2, which is a length from one side contacting the end of the first wing part 385*a* to another side contacting the end of the second wing part 385*b***.

In an embodiment, the first length L1 may be longer than the second length L2, based on the separated state in which the fixing member 380 is separated from the fixing groove 366.

In an embodiment, as the fixing member 380 is inserted into the fixing groove 366, the fixing member 380 may receive a pressure from the fixing groove 366 in both directions (e.g., +/−X direction), and the shape of the fixing member 380 may thus be deformed, for example. In various embodiments, in a coupled state in which the fixing member 380 is coupled to the fixing groove 366, a length from the end of the first wing part 385*a* to the end of the second wing part 385*b* of the fixing member 380 may be substantially equal to the second length L2.

In an embodiment, as the fixing member 380 is inserted into the fixing groove 366, the shape of the wing part 385 may change. In an embodiment, based on the separated state in which the fixing member 380 is separated from the fixing groove 366, an angle at which one wing part 385 extends to be inclined may be a first angle θ1, for example. In addition, based on the coupled state in which the fixing member 380 is inserted into the fixing groove 366, an angle at which one wing part 385 extends to be inclined may be a second angle θ2. In various embodiments, the first angle θ1 may be different from the second angle θ2. In an embodiment, the first angle θ1 may be smaller than the second angle θ2, for example.

In various embodiments, as the wing part 385, having the first length L1 longer than the second length L2, is inserted into the fixing groove 366, it may receive a first pressure F1 from an inner surface of the fixing groove 366. The first pressure F1 may act in a direction (e.g., +Z direction) opposite the insertion direction (e.g., −Z direction). The wing part 385 may be deformed by being pushed in the direction of receiving the first pressure F1, and the angle at which the wing part 385 is inclined may change from the first angle θ1 to the second angle θ2. In an embodiment, as the angle changes, a distance between the end of the first wing part 385*a* and the end of the second wing part 385*b* may become smaller.

In an embodiment, the deformation of the fixing member 380 may be temporary or permanent. In a case where the deformation of the fixing member 380 is temporary, a resilient force (not shown) may act on the fixing groove 366 while the deformation is maintained as the fixing member 380 continuously receives the first pressure F1 inside the fixing groove 366. Although not shown, the resilient force (not shown) may act in a direction opposite the first pressure F1 but is not limited thereto. For the fixing member 380 to depart from the fixing groove 366, it may be desired to receive an external force that overcomes at least the resilient force, and the resilient force (not shown) may fix the fixing member 380 inside the fixing groove 366.

In an embodiment, the elastic member 387 may include or consist of a material relatively more elastic than that of the wing part 385. In an embodiment, the wing part 385 may include or consist of substantially the same material as that of the fixing part 381 and be integral with the fixing part 381 to form a single body, for example. The elastic member 387 may include or consist of a material relatively more elastic than those of the fixing part 381 and the plurality of sub-wings 386.

In an embodiment, the elastic member 387 may include or consist of a material including at least some of polyurethane, polyvinyl chloride, silicone, or rubber. In the coupled state in which the fixing member 380 is inserted into the fixing groove 366, the elastic member 387 may change in shape by receiving a pressure from the plurality of sub-wings 386, compared to the separated state in which the fixing member 380 is separated from the fixing groove 366.

In an embodiment, while the fixing member 380 is being inserted into the fixing groove 366, the elastic member 387 may be pressed and deformed by the plurality of sub-wings 386, for example. The elastic member 387 may be shortened in length in a vertical direction (e.g., +/−Z direction) and extended in a horizontal direction (e.g., X-Y plane direction) by the pressure acting on the wing part 385. As the elastic member 387 extends in the horizontal direction, it may press the fixing groove 366 with a second pressure F2. For the fixing member 380 to depart from the fixing groove 366, it may be desired to receive an external force that overcomes at least the second pressure F2, and the second pressure F2 may fix the fixing member 380 inside the fixing groove 366.

In an embodiment, the lower sub-wing 386-1 of the wing part 385 may be pressed in an upward direction to press the first elastic member 387-1, and the middle sub-wing 386-3 of the wing part 385 may be pressed in an upward direction to press the second elastic member 387-2. The first elastic member 387-1 and the second elastic member 387-2 may each have a rigidity less than that of the plurality of sub-wings 386, and a portion of the pressure received by the first elastic member 387-1 and the second elastic member 387-2 may press the fixing groove 366, and the first elastic member 387-1 and the second elastic member 387-2 may extend into the fixing groove 366, allowing the second pressure F2 to act.

In an embodiment, the elastic member 387 may include or consist of a material with a relatively higher friction coefficient than those of other portions of the fixing member 380, such as the fixing part 381, and the second pressure F2 may include a frictional force. The elastic member 387 may have a frictional force on a surface contacting the fixing groove 366, which may limit a movement of the fixing member 380.

In an embodiment, the elastic member 387 may protrude more outwardly than the plurality of wings when the fixing member 380 is inserted into the fixing groove 366, and the protruding portion may contact the fixing groove 366, for example. The elastic member 387 may include or consist of a material with a relatively high friction coefficient, and there may thus be a frictional force (not shown) acting between the elastic member 387 and the fixing groove 366. For the fixing member 380 to depart from the fixing groove 366, it may be desired to receive an external force that overcomes at least the frictional force, and the frictional force (not shown) may fix the fixing member 380 inside the fixing groove 366.

In various embodiments, while the fixing member 380 is being inserted into the fixing groove 366, the fixing groove 366 and the fixing member 380 may tightly contact each other in at least some areas, and accordingly the shape may be temporarily or permanently deformed. Since various types of forces, such as the pressures F1 and F2 or the frictional force (not shown), act between the fixing groove 366 and the fixing member 380, it may be desired to overcome these types of forces to separate the fixing member 380 from the fixing groove 366 and stably fix the fixing member 380 to the fixing groove 366.

Figure 7A:
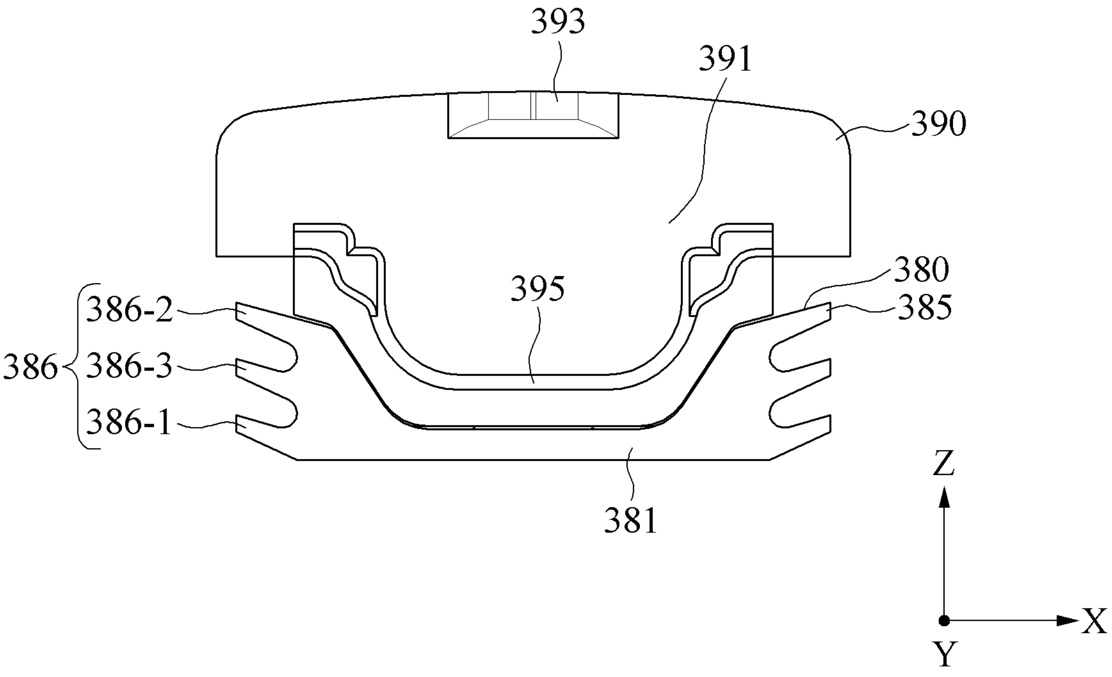
FIG. 7A is a front view of an embodiment of a cap and a fixing member.
Figure 7B:
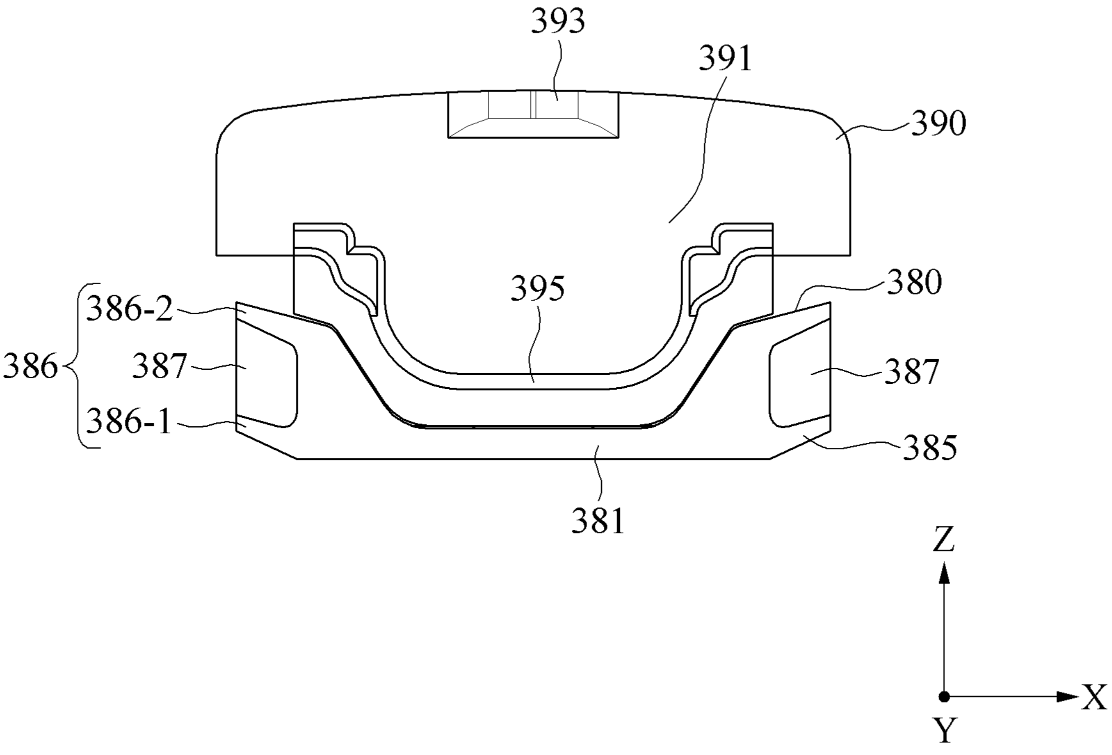
FIG. 7B is a front view of an embodiment of a cap and a fixing member.
Figure 7C:
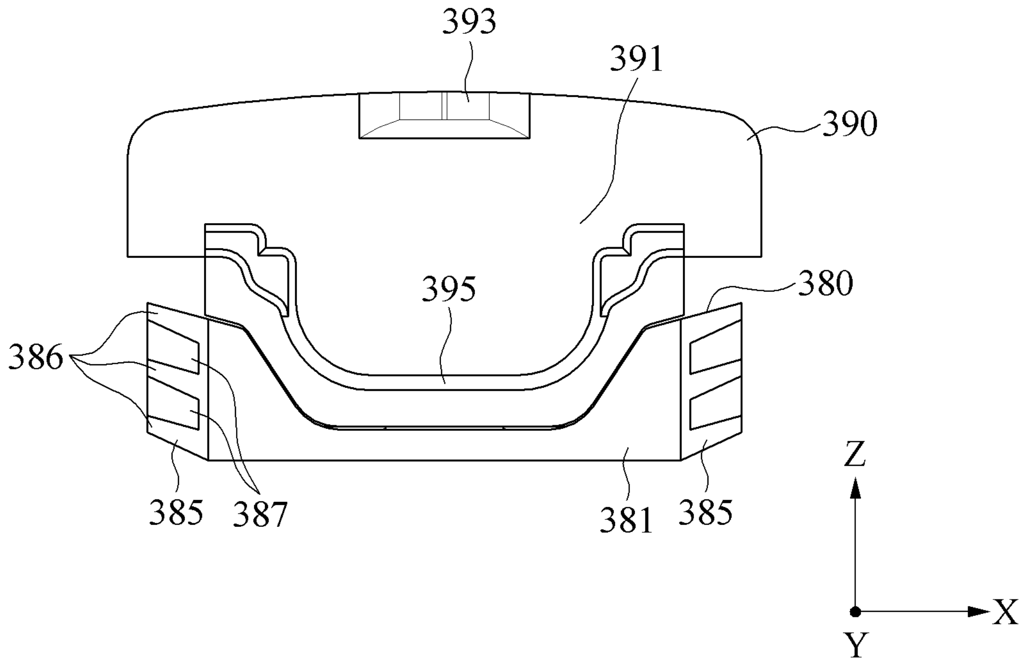
FIG. 7C is a front view of an embodiment of a cap and a fixing member.

FIGS. 7A to 7C are front views of an embodiment of the cap 390 and the fixing member 380.

Referring to FIGS. 7A to 7C, the fixing member 380 in an embodiment may include or consist of various structures and materials. The fixing member 380 shown in FIGS. 7A to 7C may be another embodiment different from an embodiment of the fixing member 380 shown in FIG. 5, but actual implementations are not limited thereto, and various embodiments of the fixing member 380 may be implemented by excluding, modifying, replacing, or adding some structures or components of the fixing member 380 within a range readily changed by those having ordinary skill in the art.

Referring to FIG. 7A, the wing part 385 may include or consist of substantially the same material as that of the fixing part 381 and may form a single body with the fixing part 381. In an embodiment, the wing part 385 and the fixing part 381 may include or consist of a material that is equally rigid and elastic, such as polycarbonate. In an alternative embodiment, the wing part 385 and the fixing part 381 may include or consist of a material that is relatively easily deformable and/or highly elastic, such as a material including at least some of polyurethane, polyvinyl chloride, silicone, or rubber.

In an embodiment, as shown in FIG. 7A, the elastic member 387 may be excluded from the fixing member 380, and a space between the plurality of sub-wings 386 may be open. In various embodiments, the open space may form clearance for the plurality of sub-wings 386 to move and may facilitate the deformation of the plurality of sub-wings 386 while the fixing member 380 is being inserted into the fixing groove 366. In addition, when the elastic member 387 is excluded, the fixing member 380 may be manufactured using only a single material injection process, without a double injection process for coupling the elastic member 387, and thus the economic feasibility and efficiency in manufacturing the fixing member 380 may thus be improved.

Referring to FIG. 7B, the plurality of sub-wings 386 may include the upper sub-wing 386-2 and the lower sub-wing 386-1, excluding the middle sub-wing 386-3, and the elastic member 387 may be formed as a single continuous body between the upper sub-wing 386-2 and the lower sub-wing 386-1.

In an embodiment, in a case where the elastic member 387 is implemented as a single body with the middle sub-wing 386-3 excluded, the fixing member 380 may be relatively more readily deformed, facilitating the insertion of the fixing member 380 into the fixing groove 366. In an alternative embodiment, an area in which the elastic member 387 contacts the fixing groove 366 may increase, which may increase a frictional force acting between the elastic member 387 and the fixing groove 366. In an alternative embodiment, a manufacturing difficulty may be relatively improved compared to a double injection process for forming the elastic member 387 in which the first elastic member 387-1 and the second elastic member 387-2 are formed separately, and a balance between the elasticity and rigidity of the fixing member 380 may be achieved.

Referring to FIG. 7C, the fixing part 381 and the wing part 385 may include or consist of different materials from each other. In an embodiment, the wing part 385 may include or consist of a material relatively more elastic than that of the fixing part 381, and the fixing part 381 may include or consist of a material relatively more rigid than the wing part 385, for example. In various embodiments, the fixing part 381 and the wing part 385 may be coupled to each other via a double injection, a coupling structure, or an adhesive member.

In an embodiment, the fixing part 381 may include or consist of a highly rigid material to stably support the cap 390, and the wing part 385 may include or consist of a highly elastic material to be relatively easily deformed, which may facilitate the insertion of the fixing member 380 into the fixing groove 366. In an alternative embodiment, the fixing member 380 may be readily inserted into and separated from the fixing groove 366, which may be advantageous for the repair and maintenance of the electronic device 301. In an embodiment, in a situation where the display 361 needs to be separated from the electronic device 301 for the repair or replacement, the fixing member 380 may be readily separated from the fixing groove 366, and the fixing member 380 may be readily coupled again to the fixing groove 366, for example.

Figure 8:
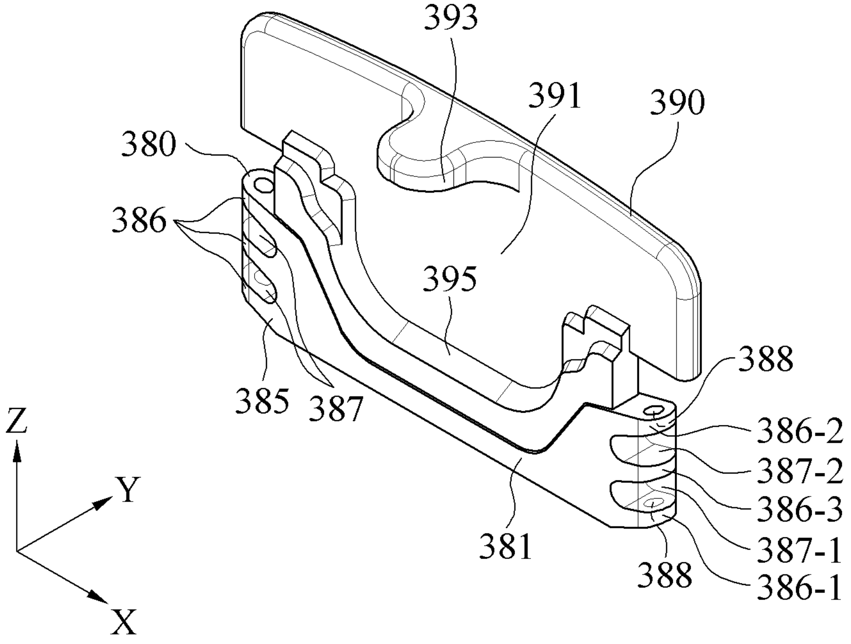
FIG. 8 is a perspective view of an embodiment of a cap and a fixing member.

FIG. 8 is a perspective view of an embodiment of the cap 390 and the fixing member 380.

Referring to FIG. 8, a groove area 388 may be defined in the fixing member 380.

In an embodiment, the groove area 388 may be formed on one surface facing the elastic member 387 in at least a portion of the plurality of sub-wings 386. The groove area 388 may be filled with the elastic member 387, and the groove area 388 may stably support the elastic member 387 to prevent it from departing.

In an embodiment, the groove area 388 may be formed in a manufacturing process of the plurality of sub-wings 386 of the fixing member 380 and may then be filled with the elastic member 387, and the elastic member 387 may be introduced into the groove area 388 to be hardened therein.

In an embodiment, the groove area 388 may reduce an area ratio of the plurality of sub-wings 386 within the fixing member 380 and increase an area ratio of the elastic member 387, and may reduce the rigidity of the fixing member 380.

In various embodiments, the groove area 388 may transfer, to the elastic member 387, a pressure (e.g., the first pressure F1 in FIG. 6C) acting on the wing part 385 as the fixing member 380 is being inserted into the fixing groove 366, and may reduce breakage or damage that may occur as the fixing member 380 is being coupled to the fixing groove 366.

In an embodiment, the groove area 388 may be a hole that is open in both directions, which is defined to penetrate from one side of the sub-wings 386 to an opposite side opposite the one side. In an embodiment, the groove area 388 of the open shape may facilitate the insertion of the fixing member 380 into the groove area 388. In an embodiment, through the groove area 388 of the open shape, the elastic member 387 may be inserted into the groove area 388, and may extend at least partially in a vertical direction (e.g., +/−Z direction) by penetrating through the wing part 385, in addition to a direction contacting the groove area 388 and in an insertion direction (e.g., +/−Z direction), for example.

In an embodiment, the groove area 388 of the open shape may improve the efficiency in manufacturing the elastic member 387. In an embodiment, when the volume of the elastic member 387 is smaller by a predetermined value or more, for example, an area where the elastic member 387 contacts the fixing groove 366 may be reduced, and when the volume of the elastic member 387 is greater by a predetermined value or more, the fixing member 380 may not be able to be inserted into the fixing groove 366. In various embodiments, the groove area 388 of the open shape may define a hole through which the elastic member 387 extends to the outside of the fixing member 380, and thus the elastic member 387 that exceeds a volume receivable by the fixing groove 366 may extend to the outside of the fixing member 380 through the groove area 388.

Figure 9A:
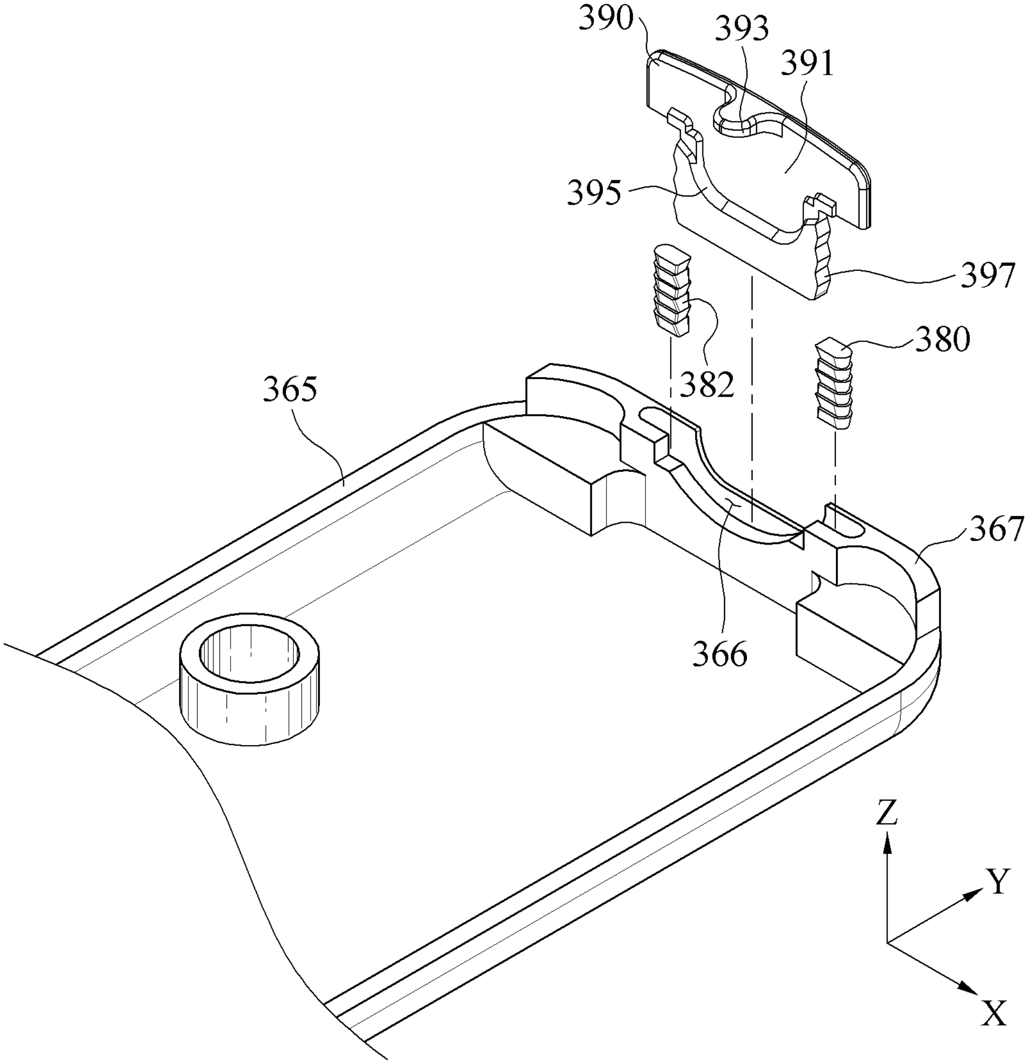
FIG. 9A illustrates a separated state of an embodiment of a hinge housing and a fixing member.
Figure 9B:
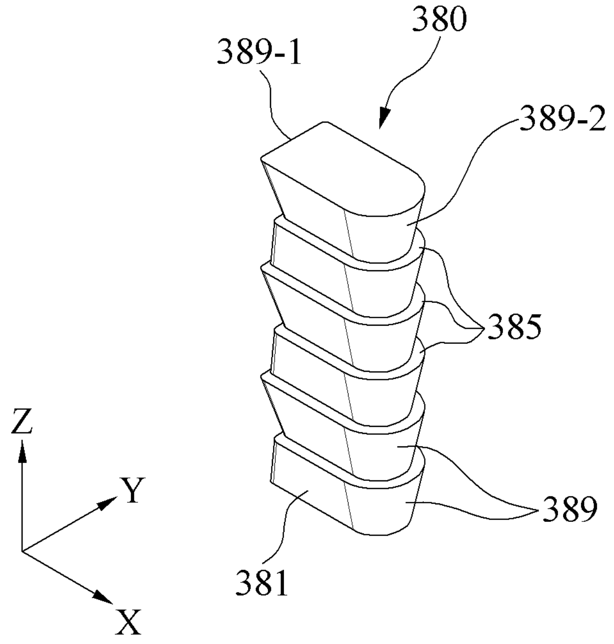
FIG. 9B is an enlarged view of an embodiment of a fixing member of FIG. 9A.

FIG. 9A illustrates an embodiment of a separated state of the hinge housing 365 and the fixing member, and FIG. 9B is an enlarged view of an embodiment of a fixing member of FIG. 9A.

Referring to FIGS. 9A and 9B, the fixing member 380 in an embodiment may be a stacked structure with a plurality of plates 389 disposed between the cap 390 and the fixing groove 366. The fixing member 380 shown in FIGS. 9A and 9B may be an embodiment of the fixing member 380 including the fixing part 381 and the wing part 385 described above with reference to FIGS. 5 to 8, and a repeated description thereof will be omitted here.

In an embodiment, the fixing member 380 may be the stacked structure with the plurality of plates 389 disposed between the cap 390 and the fixing groove 366. In this case, a stacking direction may be an insertion direction (e.g., +/−Z orientation) of the fixing member 380. In various embodiments, the plurality of plates 389 may be provided in pairs of sets such that they are each coupled in both directions (e.g., +/−X direction) of the cap 390.

In an embodiment, the hook 397 of the cap 390 may have a concavo-convex surface to engage with the fixing member 380. The plates 389 may be formed on one side 389-1 facing the cap 390, and the hook groove 382 of a concavo-convex structure to which the cap 390 is fixed may be defined in the plates 389. In various embodiments, as the hook 397 and the hook groove 382 engage with each other to be coupled, two fixing members 380 disposed on opposite sides of the cap 390 may fix the cap 390.

In an embodiment, another side 389-2 facing the fixing groove 366 may be structured such that at least a portion thereof protrudes to form the wing part 385. In an embodiment, the plates 389 may have a gradually increasing or decreasing cross-sectional area of the plate 389 in the stacking direction in which the plurality of plates 389 are stacked, for example. The wing part 385 may be a portion of the plates 389 having the increasing cross-sectional area and contacting the fixing groove 366.

In an embodiment, the plurality of plates 389 may be continuous in the stacking direction (e.g., +/−Z direction), which may prevent or reduce the plurality of sub-wings 386 from being broken or damaged due to a void between the plurality of sub-wings 386. The plurality of plates 389 may not include the elastic member 387 between the plurality of sub-wings 386, and the fixing member 380 may be implemented as a single material, without a double injection process to manufacture the fixing member 380.

In an embodiment of the disclosure, there is provided an electronic device 301 including: a display 361 including a first area 361*a*, a second area 361*b*, and a folding area 361*c* between the first area 361*a* and the second area 361*b*; a first housing 310 supporting the first area 361*a*; a second housing 320 supporting the second area 361*b*; a hinge unit 303 connected to the first housing 310 and the second housing 320, and adapted to operate between a folded state in which the first area 361*a* and the second area 361*b* face each other and an unfolded state in which the first area 361*a* and the second area 361*b* are open; a hinge housing 365 in which the hinge unit 303 is disposed; a cap 390 connected to the hinge housing 365 to cover a side 361*d* of the folding area 361*c*; and a fixing member 380 adapted to fix the cap 390 to the hinge housing 365, where a fixing groove 366 into which the fixing member 380 is inserted and fixed may be defined in the hinge housing 365, and the fixing member 380 may include: a fixing part 381 to which the cap 390 is connected and fixed; and a wing part 385 protruding from the fixing part 381 such that an end contacts the fixing groove 366 to limit a movement of the fixing member 380.

In an embodiment, the wing part 385 may extend to be inclined at a predetermined angle θ relative to a bottom surface of the fixing part 381.

In an embodiment, the wing part 385 may extend from the fixing part 381 to be inclined to face a direction opposite a direction in which the fixing member 380 is inserted into the fixing groove 366.

In an embodiment, the wing part 385 may include a first wing part 385*a* protruding in a direction from the fixing part 381 toward the first area 361*a* based on the unfolded state; and a second wing part 385*b* protruding in a direction from the fixing part 381 toward the second area 361*b* based on the unfolded state.

In an embodiment, the fixing member 380 may be formed to have a first length L1, which is a length from an end of the first wing part 385*a* to an end of the second wing part 385*b*, based on a separated state from the fixing groove 366, and the fixing groove 366 may be formed to have a second length L2, which is a length from one side contacting the end of the first wing part 385*a* to another side contacting the end of the second wing part 385*b*. The first length L1 may be longer than the second length L2.

In an embodiment, the wing part 385 may include or consist of substantially the same material as that of the fixing part 381, and form a single body with the fixing part.

In an embodiment, the wing part 385 may include or consist of a material that is relatively more elastic than that of the fixing part 381, and the fixing part 381 may include or consist of a material that is relatively more rigid than the wing part 385.

In an embodiment, the wing part 385 may include a plurality of sub-wings 386 spaced apart at predetermined intervals in an insertion direction in which the fixing member 380 is inserted into the fixing groove 366.

In an embodiment, the fixing member 380 may include an elastic member 387 filled between the plurality of sub-wings 386.

In an embodiment, the wing part 385 may include or consist of substantially the same material as that of the fixing part 381, and may be unitary with the fixing part 381, and the elastic member 387 may include or consist of a material that is relatively more elastic than those of the fixing part 381 and the plurality of sub-wings 386.

In an embodiment, a groove area 388 defined by penetrating from one side facing the elastic member 387 to another side opposite the one side, and filled with the elastic member 387 may be defined in at least some of the plurality of sub-wings 386.

In an embodiment, the elastic member 387 may change in shape by receiving a pressure from the plurality of sub-wings 386 while the elastic member 380 is inserted into the fixing groove 366, as compared to a separated state in which the fixing member 380 is separated from the fixing groove 366.

In an embodiment, the elastic member 387 may include or consist of a material having a relatively higher friction coefficient than that of the fixing part 381, such that a frictional force acts on a surface contacting the fixing groove 366 to limit the movement of the fixing member 380.

In an embodiment, the plurality of sub-wings 386 may include a lower sub-wing 386-1 connected to the bottom surface of the fixing part 381; and an upper sub-wing 386-2 connected to a top surface of the fixing part 381.

In an embodiment, the plurality of sub-wings 386 may include a middle sub-wing 386-3 disposed between the lower sub-wing 386-1 and the upper sub-wing 386-2.

In an embodiment, the fixing member 380 may be a stacked structure which includes a plurality of plates 389 disposed between the cap 390 and in which the fixing groove 366 is defined, and the plates 389 may form the fixing part 381 as one side 389-1 facing the cap 390 is fixed to the cap 390, and form the wing part 385 as another side 389-2 facing the fixing groove 366 protrudes at least partially into the fixing groove 366.

In an embodiment, the plates 389 may each be provided in a structure including an increasing cross-sectional area in a stacking direction.

In an embodiment of the disclosure, there is provided an electronic device 301 including: a display 361 including a first area 361*a*, a second area 361*b*, and a folding area 361*c* between the first area 361*a* and the second area 361*b*; a first housing 310 supporting the first area 361*a*; a second housing 320 supporting the second area 361*b*; a hinge unit 303 connected to the first housing 310 and the second housing 320, and adapted to operate between a folded state in which the first area 361*a* and the second area 361*b* face each other and an unfolded state in which the first area 361*a* and the second area 361*b* are open; a hinge housing 365 in which the hinge unit 303 is disposed; a cap 390 connected to the hinge housing 365 to cover a side 361*d* of the folding area 361*c*; and a fixing member 380 adapted to fix the cap 390 to the hinge housing 365, where a fixing groove 366 into which the fixing member 380 is inserted and fixed may be defined in the hinge housing 365, and the fixing member 380 may include: a fixing part 381 to which the cap 390 is connected and fixed; a wing part 385 including a plurality of sub-wings 386 spaced apart at predetermined intervals in an insertion direction in which the fixing member 380 is inserted into the fixing groove 366, where an end of the plurality of sub-wings 386 protrudes from the fixing part 381 to contact the fixing groove 366, to limit a movement of the fixing member 380; and an elastic member 387 filled between the plurality of sub-wings 386.

In an embodiment, the plurality of sub-wings 386 may include a lower sub-wing 386-1 connected to a bottom surface of the fixing part 381; an upper sub-wing 386-2 connected to a top surface of the fixing part 381; and a middle sub-wing 386-3 disposed between the lower sub-wing 386-1 and the upper sub-wing 386-2.

In an embodiment, the fixing member 380 may include a first elastic member 387-1 filled between the lower sub-wing 386-1 and the middle sub-wing 386-3; and a second elastic member 387-2 filled between the upper sub-wing 386-2 and the middle sub-wing 386-3.

While the disclosure has been shown and described with reference to various embodiments thereof, it will be understood that the various embodiments are intended to be illustrative, not limiting. It will further be understood by those skilled in the art that various changes in form and details may be made therein without departing from the true spirit and full scope of the disclosure as defined by the appended claims and their equivalents. It will also be understood that any of the embodiment(s) described herein may be used in conjunction with any other embodiment(s) described herein.

The invention claimed is:

1. An electronic device comprising:

a display comprising a first area, a second area, and a folding area between the first area and the second area;

a first housing supporting the first area;

a second housing supporting the second area;

a hinge unit which is connected to the first housing and the second housing, and operates between a folded state in which the first area and the second area face each other and an unfolded state in which the first area and the second area are open;

a hinge housing in which the hinge unit is disposed and in which a fixing groove is defined;

a cap connected to the hinge housing and covering a side of the folding area; and a fixing member which is inserted and fixed into the fixing groove and fixes the cap to the hinge housing, the fixing member comprising:

a fixing part to which the cap is connected and fixed; and a wing part protruding from the fixing part and including an end contacting a lateral inner surface of the fixing groove and limiting a movement of the fixing member.

2. The electronic device of claim 1, wherein the wing part is inclined at a predetermined angle relative to a bottom surface of the fixing part.

3. The electronic device of claim 1, wherein the wing part extends from the fixing part, inclined and facing a direction opposite a direction in which the fixing member is inserted into the fixing groove.

4. The electronic device of claim 1, wherein the wing part comprises:

a first wing part protruding in a direction from the fixing part toward the first area based on the unfolded state; and a second wing part protruding in a direction from the fixing part toward the second area based on the unfolded state.

5. The electronic device of claim 4, wherein the fixing member has a first length, which is a length from an end of the first wing part to an end of the second wing part, based on a separated state from the fixing groove, and the fixing groove has a second length, which is a length from one side contacting the end of the first wing part to another side contacting the end of the second wing part, wherein the first length is longer than the second length.

6. The electronic device of claim 1, wherein the wing part includes substantially a same material as a material of the fixing part, and forms a single body with the fixing part.

7. An electronic device comprising:

a display comprising a first area, a second area, and a folding area between the first area and the second area;

a first housing supporting the first area;

a second housing supporting the second area;

a hinge unit which is connected to the first housing and the second housing, and operates between a folded state in which the first area and the second area face each other and an unfolded state in which the first area and the second area are open;

a hinge housing in which the hinge unit is disposed and in which a fixing groove is defined;

a cap connected to the hinge housing and covering a side of the folding area; and a fixing member which is inserted and fixed into the fixing groove and fixes the cap to the hinge housing, the fixing member comprising:

a fixing part to which the cap is connected and fixed; and a wing part protruding from the fixing part and including an end contacting the fixing groove and limiting a movement of the fixing member, wherein the wing part includes a material that is relatively more elastic than a material of the fixing part, and the fixing part includes a material that is relatively more rigid than the wing part.

8. An electronic device comprising:

a display comprising a first area, a second area, and a folding area between the first area and the second area;

a first housing supporting the first area;

a second housing supporting the second area;

a hinge unit which is connected to the first housing and the second housing, and operates between a folded state in which the first area and the second area face each other and an unfolded state in which the first area and the second area are open;

a hinge housing in which the hinge unit is disposed and in which a fixing groove is defined;

a cap connected to the hinge housing and covering a side of the folding area; and a fixing member which is inserted and fixed into the fixing groove and fixes the cap to the hinge housing, the fixing member comprising:

a fixing part to which the cap is connected and fixed; and a wing part protruding from the fixing part and including an end contacting the fixing groove and limiting a movement of the fixing member, wherein the wing part comprises a plurality of sub-wings spaced apart at predetermined intervals in an insertion direction in which the fixing member is inserted into the fixing groove.

9. The electronic device of claim 8, wherein the fixing member comprises an elastic member filled between the plurality of sub-wings.

10. The electronic device of claim 9, wherein the wing part includes substantially a same material as a material of the fixing part, and is unitary with the fixing part, and the elastic member includes a material that is relatively more elastic than a material of the fixing part and a material of the plurality of sub-wings.

11. The electronic device of claim 9, wherein a groove area penetrating from one side facing the elastic member to another side opposite the one side is defined in at least some of the plurality of sub-wings, and the groove area is filled with the elastic member.

12. The electronic device of claim 9, wherein the elastic member changes in shape by receiving a pressure from the plurality of sub-wings while the elastic member is inserted into the fixing groove, as compared to a separated state in which the fixing member is separated from the fixing groove.

13. The electronic device of claim 9, wherein the elastic member includes a material having a relatively higher friction coefficient than a friction coefficient of a material of the fixing part so that a frictional force acts on a surface contacting the fixing groove and limits the movement of the fixing member.

14. The electronic device of claim 8, wherein the plurality of sub-wings comprises:

a lower sub-wing connected to a bottom surface of the fixing part; and an upper sub-wing connected to a top surface of the fixing part.

15. The electronic device of claim 14, wherein the plurality of sub-wings comprises:

a middle sub-wing disposed between the lower sub-wing and the upper sub-wing.

16. The electronic device of claim 1, wherein the fixing member is a stacked structure which includes a plurality of plates disposed between the cap and in which the fixing groove is defined, wherein the plates form the fixing part as one side facing the cap is fixed to the cap, and form the wing part as another side facing the fixing groove protrudes at least partially into the fixing groove.

17. The electronic device of claim 16, wherein the plates are each provided in a structure including an increasing cross-sectional area in a stacking direction.

18. An electronic device, comprising:

a display comprising a first area, a second area, and a folding area between the first area and the second area;

a first housing supporting the first area;

a second housing supporting the second area;

a hinge unit which is connected to the first housing and the second housing, and operates between a folded state in which the first area and the second area face each other and an unfolded state in which the first area and the second area are open;

a hinge housing in which the hinge unit is disposed and in which a fixing groove is defined;

a cap connected to the hinge housing and covering a side of the folding area; and a fixing member which is inserted and fixed into the fixing groove and fixes the cap to the hinge housing, the fixing member comprising:

a fixing part to which the cap is connected and fixed;

a wing part comprising:

a plurality of sub-wings spaced apart at predetermined intervals in an insertion direction in which the fixing member is inserted into the fixing groove, the plurality of sub-wings comprising:

an end of the plurality of sub-wings protruding from the fixing part, contacting the fixing groove, and limiting a movement of the fixing member; and an elastic member disposed between the plurality of sub-wings.

19. The electronic device of claim 18, wherein the plurality of sub-wings comprise:

a lower sub-wing connected to a bottom surface of the fixing part;

an upper sub-wing connected to a top surface of the fixing part; and a middle sub-wing disposed between the lower sub-wing and the upper sub-wing.

20. The electronic device of claim 19, wherein the fixing member comprises:

a first elastic member disposed between the lower sub-wing and the middle sub-wing; and a second elastic member disposed between the upper sub-wing and the middle sub-wing.

* * * * *